(12) United States Patent
Ono et al.

(10) Patent No.: US 12,098,470 B2
(45) Date of Patent: Sep. 24, 2024

(54) ELECTROCHEMICAL REACTION DEVICE

(71) Applicant: KABUSHIKI KAISHA TOSHIBA, Tokyo (JP)

(72) Inventors: Akihiko Ono, Kita (JP); Satoshi Mikoshiba, Yamato (JP); Yuki Kudo, Yokohama (JP); Masakazu Yamagiwa, Yokohama (JP); Jun Tamura, Chuo (JP); Yoshitsune Sugano, Kawasaki (JP); Ryota Kitagawa, Setagaya (JP); Eishi Tsutsumi, Kawasaki (JP); Asahi Motoshige, Ota (JP); Takayuki Tsukagoshi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 264 days.

(21) Appl. No.: 17/165,684

(22) Filed: Feb. 2, 2021

(65) Prior Publication Data

US 2021/0156040 A1    May 27, 2021

Related U.S. Application Data

(63) Continuation of application No. 15/694,332, filed on Sep. 1, 2017, now abandoned.

(30) Foreign Application Priority Data

Mar. 21, 2017 (JP) ................. 2017-054566

(51) Int. Cl.
*C25B 15/08* (2006.01)
*C25B 1/00* (2021.01)
(Continued)

(52) U.S. Cl.
CPC ............... *C25B 15/08* (2013.01); *C25B 1/00* (2013.01); *C25B 1/04* (2013.01); *C25B 1/55* (2021.01);
(Continued)

(58) Field of Classification Search
CPC ... C25B 9/73; C25B 1/04; C25B 3/26; H01M 8/00–8/24
See application file for complete search history.

(56) References Cited

U.S. PATENT DOCUMENTS

| 5,879,521 A | 3/1999 | Shimamune et al. |
| 6,316,137 B1 * | 11/2001 | Kralick ............... H01M 8/0267 29/623.2 |

(Continued)

FOREIGN PATENT DOCUMENTS

| EP | 0 285 019 A1 | 10/1988 |
| JP | 63-262490 | 10/1988 |

(Continued)

OTHER PUBLICATIONS

Selamet et al ("Development and testing of a highly efficient proton exchange membrane (PEM) electrolyzer stack", International Journal of Hydrogen Energy, 36, 2011, pp. 11480-11487) (Year: 2011).*

(Continued)

*Primary Examiner* — Alexander W Keeling
(74) *Attorney, Agent, or Firm* — Oblon, McClelland, Maier & Neustadt, L.L.P.

(57) ABSTRACT

An electrochemical reaction device comprises: an anode to oxidize water; an electrolytic solution flow path facing on the anode and through which an electrolytic solution containing the water flows; a cathode including: a porous conductive layer having first and second surfaces; and a reduction catalyst layer having a third surface disposed on the first surface and containing a reduction catalyst to reduce carbon dioxide; a separator between the anode and the cathode; a power supply connected to the anode and the cathode; and a flow path plate including: a fourth surface on the second surface; and a flow path facing on the second surface and through which the carbon dioxide flows. A ratio (Continued)

of an area of an overlap of the second surface and the flow path to an area of the second surface is 0.5 or more and 0.85 or less.

19 Claims, 10 Drawing Sheets

(51) Int. Cl.
*C25B 1/04* (2021.01)
*C25B 1/55* (2021.01)
*C25B 3/25* (2021.01)
*C25B 9/00* (2021.01)
*C25B 9/23* (2021.01)
*C25B 9/73* (2021.01)
*C25B 11/031* (2021.01)

(52) U.S. Cl.
CPC .................. *C25B 3/25* (2021.01); *C25B 9/00* (2013.01); *C25B 9/23* (2021.01); *C25B 9/73* (2021.01); *C25B 11/031* (2021.01); *Y02E 60/36* (2013.01)

(56) References Cited

U.S. PATENT DOCUMENTS

| | | |
|---|---|---|
| 6,423,194 B1 | 7/2002 | Furuya |
| 9,181,625 B2 | 11/2015 | Masel et al. |
| 2004/0067409 A1 | 4/2004 | Tanaka et al. |
| 2006/0099480 A1 | 5/2006 | Henderson |
| 2007/0072044 A1* | 3/2007 | Sakaue ............ H01M 8/04201 264/618 |
| 2008/0248336 A1* | 10/2008 | Matcham ............ H01M 8/0267 429/414 |
| 2010/0213051 A1* | 8/2010 | Ishikawa ............ H01M 8/2483 204/252 |
| 2011/0132748 A1* | 6/2011 | Haryu ...................... C25B 1/04 204/263 |
| 2012/0292199 A1 | 11/2012 | Deguchi et al. |
| 2013/0015059 A1 | 1/2013 | Haryu |
| 2015/0132677 A1 | 5/2015 | Wuillemin |
| 2015/0176140 A1 | 6/2015 | Wuillemin |
| 2016/0010227 A1 | 1/2016 | Pant et al. |
| 2016/0107154 A1 | 4/2016 | Masel et al. |
| 2016/0108530 A1* | 4/2016 | Masel ...................... B01J 41/14 204/265 |
| 2017/0037522 A1* | 2/2017 | Kaczur ...................... C25B 9/19 |
| 2017/0321334 A1 | 11/2017 | Kuhl |
| 2018/0127885 A1 | 5/2018 | Krause |
| 2018/0237924 A1 | 8/2018 | Reytier |

FOREIGN PATENT DOCUMENTS

| | | |
|---|---|---|
| JP | 10-81987 | 3/1998 |
| JP | 2000-273674 | 10/2000 |
| JP | 2004-244676 | 9/2004 |
| JP | 5017499 | 9/2012 |
| JP | WO2012/128148 A1 | 9/2012 |
| JP | 2015-59231 A | 3/2015 |
| JP | 2016-516260 | 6/2016 |
| JP | 6046810 | 12/2016 |
| WO | WO 2007/129727 A1 | 11/2007 |

OTHER PUBLICATIONS

Zengcai Liu, et al. "Electrochemical generation of syngas from water and carbon dioxide at industrially important rates", Journal of $CO_2$ Utilization, vol. 15, 2015, 7 pages.

Extended European Search Report issued Jan. 5, 2018 in European Patent Application No. 17189182.3, 7 pages.

"Solar-cell efficiency", Wikipedia created Oct. 23, 2010 and last edited Aug. 13, 2023. 19 pages.

Vijayalaxmi Kinhal, "Efficiency of Wind Energy", printed Aug. 29, 2023 <URL: https://www.lovetoknow.com/home/sustainability/efficiency-wind-energy>. 16 pages.

Science Direct, "Engine Thermal Efficiency", Journal of the Energy Institute, 2020, printed Aug. 29, 2023, <URL: https://www.sciencedirect.com/topics/engineering/engine-thermal-efficiency>. 22 pages.

Original and English Translation of J-Power homepage, "World's Highest Level of Power Generation Efficiency", printed Aug. 29, 2023, <URL: https://www.jpower.co.jp/bs/karyoku/sekitan/sekitan_q03.html>. Total 8 pages.

Original and English Translation of New Electric Power NET homepage, "Chubu Electric Power achieves 63.08% power generation efficiency at LNG-fired power plant, certified by Guinness for the world's highest efficiency", printed Aug. 29, 2023, <URL: https://pps-net.org/column/54364>. Total 6 pages.

\* cited by examiner

ELECTROCHEMICAL REACTION DEVICE

CROSS-REFERENCE TO RELATED APPLICATION

This application is a Continuation of U.S. application Ser. No. 15/694,332, filed Sep. 1, 2017, which is based upon and claims the benefit of priority from Japanese Patent Application No. 2017-054566, filed on Mar. 21, 2017; the entire contents of which are incorporated herein by reference.

FIELD

Embodiments described herein generally relate to an electrochemical reaction device.

BACKGROUND

In recent years, from the viewpoints of both energy problems and environment problems, not only converting the renewable energy such as sunlight into the electric energy to utilize it, but also converting it into a storable and conveyable state is highly desired. In response to this demand, research and development on an artificial photosynthesis technology that produces chemical substances using the sunlight like the photosynthesis by plants are in progress. This technology also creates a possibility of storing the renewable energy as a storable fuel, and further, produces chemical substances to be industrial raw materials, and thereby, creation of value is also promising.

As a device that produces the chemical substances using the renewable energy such as the sunlight, there has been known an electrochemical reaction device that includes a cathode to reduce carbon dioxide ($CO_2$) from, for example, a power plant and a waste treatment plant and an anode to oxidize water ($H_2O$). The cathode reduces carbon dioxide to produce a carbon compound such as carbon monoxide (CO), for example. When such an electrochemical reaction device is fabricated by a cell form (to be also referred to as an electrolysis cell), fabricating the electrochemical reaction device by a form similar to a fuel cell such as a Polymer Electric Fuel Cell (PEFC), for example, is considered to be effective. However, in this case, a problem similar to a problem that the PEFC has is sometimes caused.

DETAILED DESCRIPTION

An electrochemical reaction device according to an embodiment comprises: an anode to oxidize water and thus generate oxygen; an electrolytic solution flow path facing on the anode and through which an electrolytic solution containing the water flows; a cathode including: a porous conductive layer having a first surface and a second surface; and a reduction catalyst layer having a third surface disposed on the first surface and containing a reduction catalyst to reduce carbon dioxide and thus generate a carbon compound; a separator between the anode and the cathode; a power supply connected to the anode and the cathode; and a flow path plate including: a fourth surface on the second surface; and a flow path facing on the second surface and through which the carbon dioxide flows. A ratio of an area of an overlap of the second surface and the flow path to an area of the second surface is 0.5 or more and 0.85 or less.

Hereinafter, there will be explained an embodiment with reference to the drawings. Note that the drawings are schematic and, for example, dimensions such as thickness and width of components may differ from actual dimensions of the components. Besides, in the embodiment, substantially the same components are denoted by the same reference signs and the description thereof will be omitted in some cases.

Figure 1:
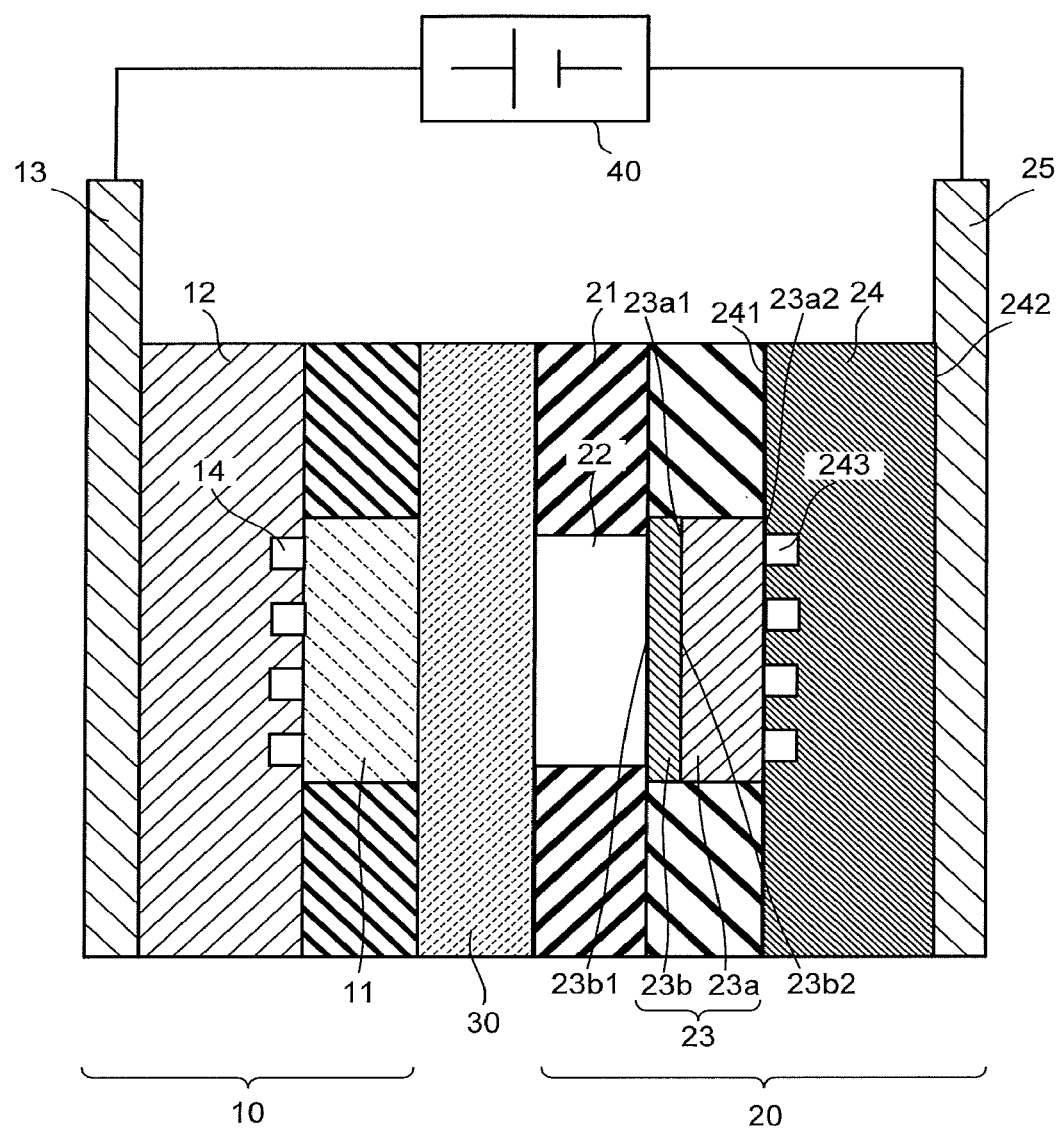
FIG. 1 is a schematic view illustrating a structure example of an electrochemical reaction device.
Figure 2:
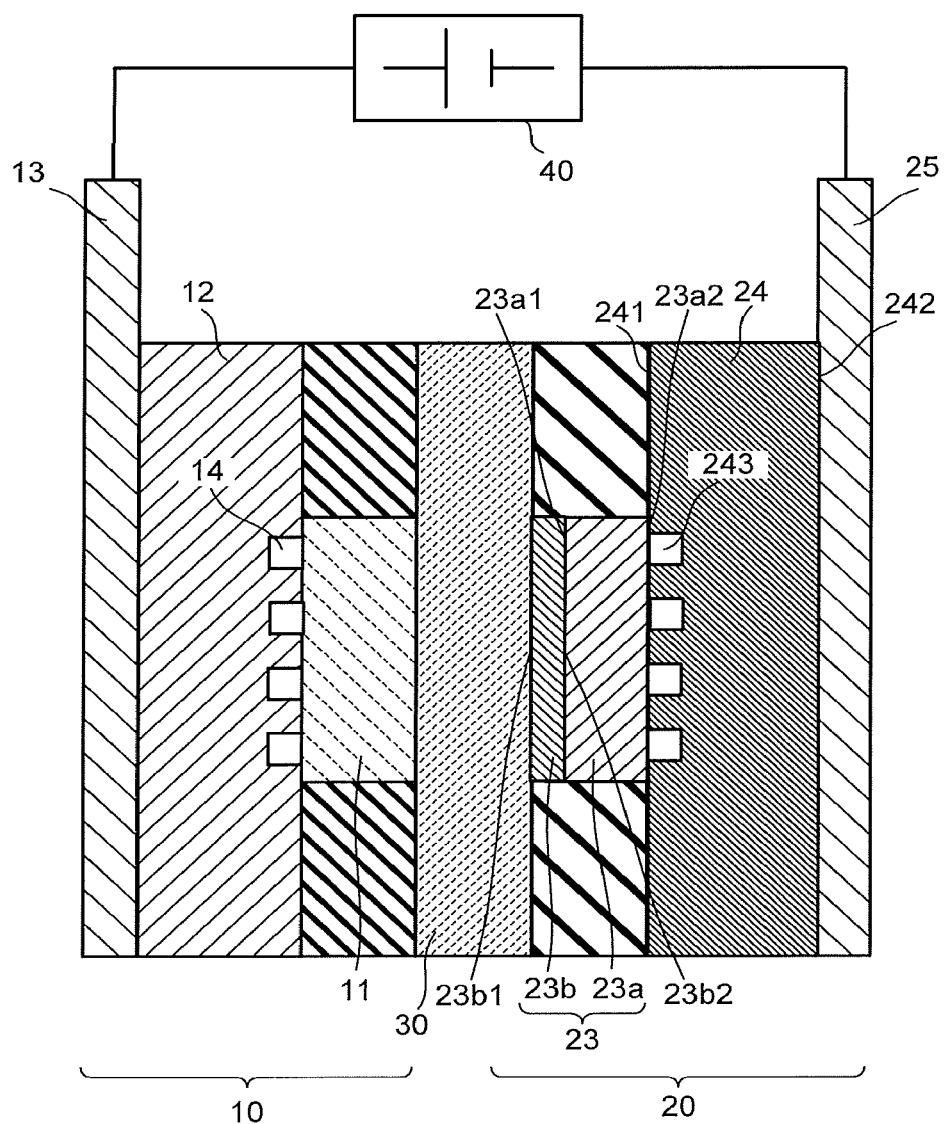
FIG. 2 is a schematic view illustrating another structure example of the electrochemical reaction device.

FIG. 1 and FIG. 2 are a schematic cross-sectional view illustrating a structure example of an electrochemical reaction device according to an embodiment. The electrochemical reaction device includes an anode part 10, a cathode part 20, a separator 30, and a power supply 40.

The anode part 10 can oxidize water ($H_2O$) to produce oxygen and hydrogen ions, or oxidize hydroxide ions (OH) to produce water and oxygen. The anode part 10 includes an anode 11, a flow path plate 12, a current collector 13, and a flow path 14.

The anode 11 is formed by supporting an oxidation catalyst on a substrate having a porous structure such as a mesh material, a punching material, a porous body, or a metal fiber sintered body, for example. The substrate may be formed of a metal such as titanium (Ti), nickel (Ni), or iron (Fe), or a metal material such as an alloy (for example, SUS) containing at least one of these metals. The anode 11 is supported by a support or the like, for example. The support has an opening, for example, and in the opening, the anode 11 is disposed.

As the oxidation catalyst, a material that lowers activation energy for oxidizing water can be cited. In other words, a material that lowers an overvoltage when oxygen and hydrogen ions are produced through an oxidation reaction of water can be cited. For example, iridium, iron, platinum, cobalt, manganese, and so on can be cited. Alternatively, a binary metal oxide, a ternary metal oxide, a quaternary metal oxide, or the like can be used as the oxidation catalyst. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), ruthenium oxide (Ru—O), and so on. Examples of the ternary metal oxide include Ni—Co—O, La—Co—O, Ni—La—O, Sr—Fe—O, and so on. Examples of the quaternary metal oxide include Pb—Ru—Ir—O, La—Sr—Co—O, and so on. The oxidation catalyst is not limited to the above, and as the oxidation catalyst, a metal complex such as a Ru complex or a Fe complex can also be used. Further, a plurality of materials may be mixed.

The flow path plate 12 has a groove facing the anode 11. The flow path plate 12 has a function as a flow path plate. As the flow path plate 12, a material having low chemical stability and high conductivity is preferably used. Examples of such a material include metal materials such as Ti and SUS, carbon, and so on.

The current collector 13 is electrically connected to the anode 11 via the flow path plate 12. The current collector 13 preferably contains a material having low chemical stability and high conductivity. Examples of such a material include metal materials such as Ti and SUS, carbon, and so on.

The flow path 14 contains a space between the anode 11 and the groove in the flow path plate 12. The flow path 14 has a function as an electrolytic solution flow path for allowing a first electrolytic solution containing substances to be oxidized such as water to flow therethrough.

The cathode part 20 can reduce carbon dioxide ($CO_2$) to produce a carbon compound and hydrogen. The cathode part 20 includes a flow path plate 21, a flow path 22, a cathode 23, a flow path plate 24 including a flow path 243, and a current collector 25. As illustrated in FIG. 2, the flow path plate 21 does not need to be provided.

The flow path plate 21 has an opening having a function as the flow path 22. The flow path 22 is provided for allowing a second electrolytic solution containing water and carbon dioxide to flow therethrough. The second electrolytic solution may contain carbon dioxide. The flow path plate 21 preferably contains a material having low chemical reactivity and no conductivity. Examples of such a material include insulating materials such as an acrylic resin, polyetheretherketone (PEEK), and a fluorocarbon resin. Changing the amount of water contained in the electrolytic solution flowing through the flow path 22 and components of the electrolytic solution makes it possible to change oxidation-reduction reactivity and change selectivity of substances to be reduced and ratios of chemical substances to be produced.

At least one of the anode 11 and the cathode 23 may have a porous structure. Examples of the material applicable to an electrode layer having the porous structure include a carbon black such as ketjen black or VULCAN XC-72, activated carbon, metal fine powder, and so on, in addition to the above-described materials. The area of an activation surface that contributes to the oxidation-reduction reaction can be made large by having the porous structure, so that it is possible to increase conversion efficiency.

As a reduction catalyst, a material that lowers activation energy for reducing hydrogen ions and carbon dioxide can be cited. In other words, a material that lowers an overvoltage when hydrogen and a carbon compound are produced through a reduction reaction of hydrogen ions and carbon dioxide can be cited. For example, a metal material or a carbon material can be used. As the metal material, for example, a metal such as platinum or nickel, or an alloy containing the metal can be used in the case of the reduction reaction of hydrogen. As the metal material, a metal such as gold, aluminum, copper, silver, platinum, palladium, or nickel, or an alloy containing the metal can be used in the case of the reduction reaction of carbon dioxide. As the carbon material, graphene, carbon nanotube (CNT), fullerene, ketjen black, or the like can be used, for example. The reduction catalyst is not limited to the above, and as the reduction catalyst, for example, a metal complex such as a Ru complex or a Re complex, or an organic molecule having an imidazole skeleton or a pyridine skeleton may be used. Further, a plurality of materials may be mixed.

An example of the carbon compound produced by the reduction reaction differs depending on the kind of the reduction catalyst. The compound produced by the reduction reaction is a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), or ethylene glycol, or hydrogen, for example.

The porous structure preferably has a fine pore distribution of 5 nm or more and 100 nm or less. With the fine pore distribution, an increase in catalyst activity is enabled. Furthermore, the porous structure preferably has a plurality of fine pore distribution peaks. This can achieve all of an increase in surface area, an improvement in dispersion of ions and reactant, and high conductivity at the same time. For example, the cathode 23 may be formed by stacking a reduction catalyst layer containing particles of a metal or an alloy applicable to the above-described reduction catalyst of 100 nm or less (a particulate reduction catalyst) on a conductive layer of the above-described material having a fine pore distribution of 5 μm or more and 10 μm or less. In this case, the particle may also have the porous structure, but does not always need to have the porous structure from the conductivity or the relationship between a reaction site and material diffusion. Further, the above-described particles may be supported by another material.

The cathode 23 includes a porous conductive layer 23a having a function as a gas diffusion layer, for example, and a reduction catalyst layer 23b stacked on the porous conductive layer 23a and containing the reduction catalyst. The cathode 23 is supported by a support, or the like, for example. The support has an opening, for example, and in the opening, the cathode 23 is disposed.

The porous conductive layer 23a has a surface 23a1, a surface 23a2 facing the flow path plate 24, and a pore portion communicating from the surface 23a1 to the surface 23a2. An average pore size of the pore portion is preferred to be 10 μm or less. The porous conductive layer 23a preferably has a thickness of 100 to 500 μm. In the case of the thickness being 100 μm or less, uniformity on a cell surface deteriorates, in the case of the thickness being thick, a cell thickness and a member cost increase, and further, in the case of the thickness being 500 μm or more, efficiency decreases due to an increase in gas diffusibility. The porous conductive layer 23a is formed of a carbon paper, a carbon cloth, or the like, for example.

The reduction catalyst layer 23b has a surface 23b1 facing the flow path 22 and a surface 23b2 in contact with the surface 23a1 of the porous conductive layer 23a. The reduction catalyst layer 23b has, for example, a porous conductive layer (mesoporous layer) having a pore size smaller than that of the porous conductive layer 23a and the reduction catalyst supported on a surface of the porous conductive layer. Changing water repellency and porous body degree among the porous conductive layer 23a, the mesoporous layer, and the reduction catalyst makes it possible to accelerate gas diffusibility and discharge of liquid components. Further, an area of the porous conductive layer 23a may be made larger than an area of the reduction catalyst layer 23b. This makes it possible to supply gas to a cell uniformly and accelerate discharge of liquid components by combining with the structure of the flow path plate 24 and the porous conductive layer 23a.

As the porous conductive layer, a mixture of Nafion and conductive particles such as ketjen black may be used, and as the reduction catalyst, a gold catalyst may be used. Further, formation of projections and recesses of 5 μm or less on the surface of the reduction catalyst can increase the reaction efficiency. Further, the surface of the reduction catalyst is oxidized by application of a high frequency, and then subjected to electrochemical reduction, and thereby the cathode 23 having a nanoparticle structure can be formed. Other than gold, metal such as copper, palladium, silver, zinc, tin, bismuth, or lead is preferred. Besides, the porous conductive layer may further have a stacked structure composed of layers having different pore sizes. The stacked structure having the different pore sizes makes it possible to adjust the difference in reaction due to the difference in reaction product concentration near, for example, an electrode layer, the difference in pH, or the like, by the pore sizes to improve the efficiency.

When an electrode reaction with a low current density is performed by using relatively low light irradiation energy, there is a wide range of options in catalyst material. Accordingly, for example, it is easy to perform a reaction by using a ubiquitous metal or the like, and it is also relatively easy to obtain selectivity of the reaction. When the power supply 40 formed of a photoelectric conversion body is electrically connected to at least one of the anode 11 and the cathode 23 by a wire or the like, an electrode area generally becomes small for the reason of miniaturizing an electrolytic solution tank to achieve space saving, cost reduction, or the like, and the reaction is performed with a high current density in some cases. In this case, a noble metal is preferably used as the catalyst.

The electrochemical reaction device according to this embodiment is a simplified system, in which the anode 11 and the cathode 23 are integrated to reduce the number of parts. Accordingly, for example, manufacture, installation, and maintainability improve.

Figure 3:
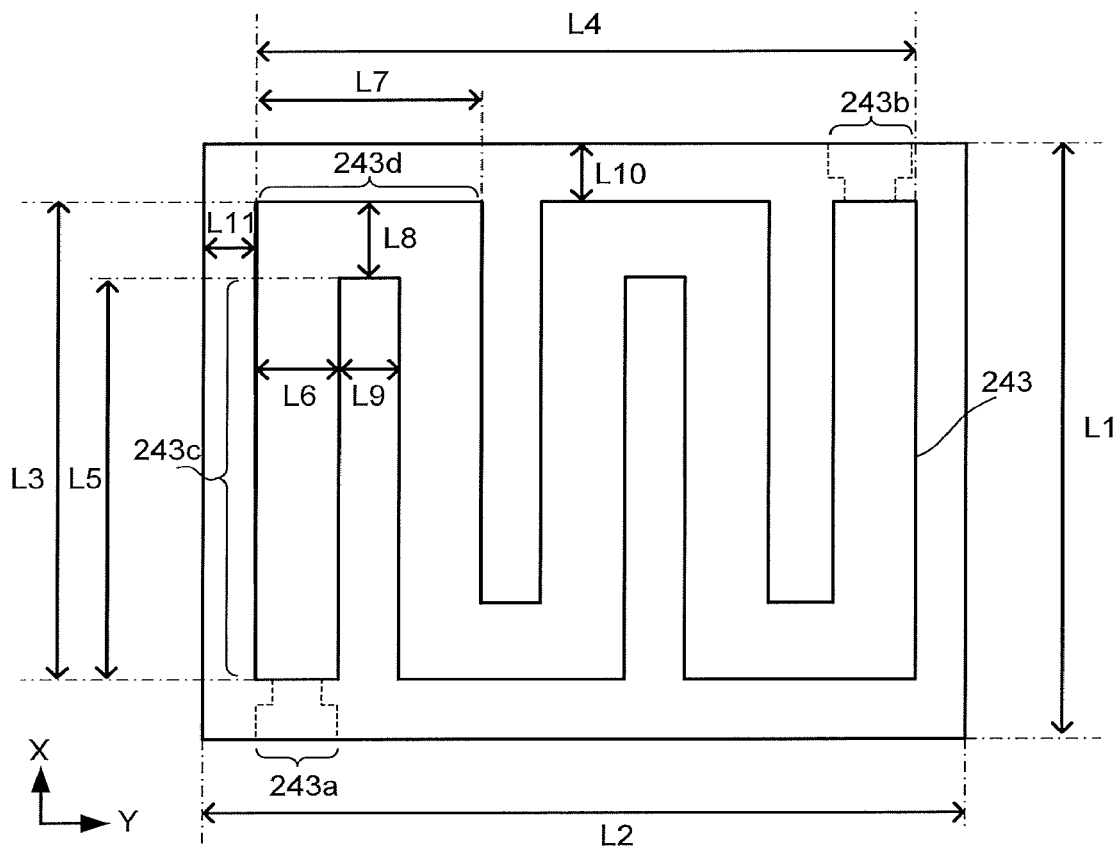
FIG. 3 is a schematic top view illustrating a structure example of a part of a flow path plate.
Figure 4:
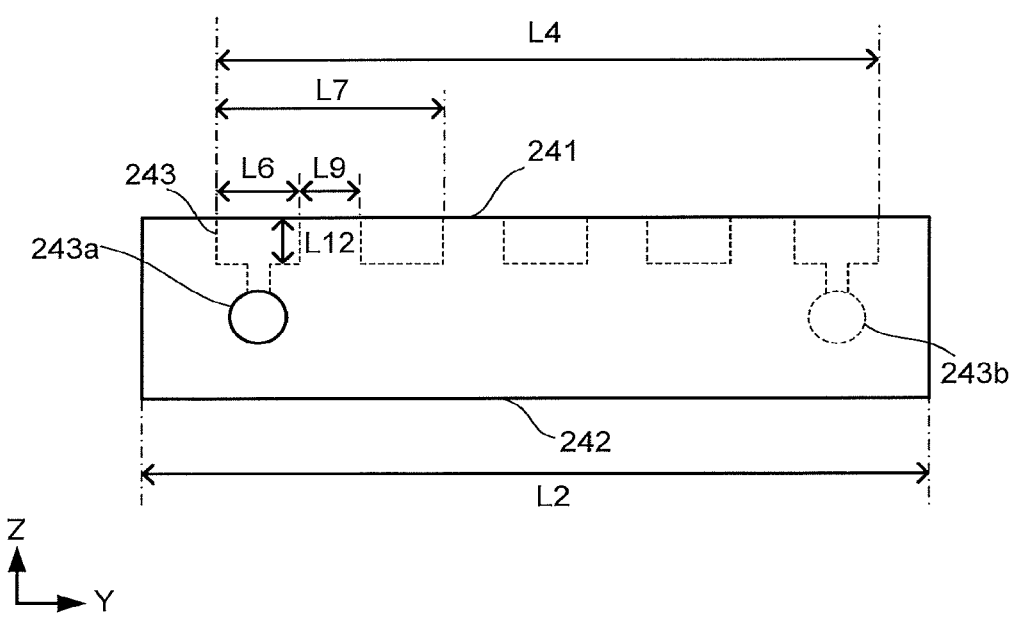
FIG. 4 is a schematic side view illustrating a structure example of a part of the flow path plate.

FIG. 3 is a schematic top view illustrating a structure example of a part of the flow path plate 24. FIG. 3 illustrates an X-Y plane of the flow path plate 24 including an X axis and a Y axis perpendicular to the X axis. FIG. 4 is a schematic side view illustrating a structure example of a part of the flow path plate 24. FIG. 4 illustrates a Y-Z plane of the flow path plate 24 including the Y axis and a Z axis perpendicular to the Y axis and the X axis. In FIG. 3 and FIG. 4, only an overlap of the flow path plate 24 and the surface 23b2 or the surface 23a2 is schematically illustrated.

The flow path plate 24 includes a surface 241, a surface 242, and the flow path 243. The surface 241 is in contact with the porous conductive layer 23a. The surface 242 faces the surface 241, and is in contact with the current collector 25. The flow path plate 24 illustrated in FIG. 3 and FIG. 4 has a rectangular parallelepiped shape, but is not limited to this.

The flow path 243 faces the surface 23a2 of the porous conductive layer 23a. The flow path 243 communicates with an inflow port 243a and an outflow port 243b. The inflow port 243a is provided in order to allow carbon dioxide to flow into the flow path 243 from the outside of the flow path plate 24 (outside of the cathode part 20). At least a part of the above-described carbon dioxide is gaseous. The outflow port 243b is provided in order to allow the carbon dioxide to flow out to the outside of the flow path plate 24 (outside of the cathode part 20) from the flow path 243 and allow a reaction product produced by the reduction reaction to flow out to the outside of the flow path plate 24.

The flow path 243 illustrated in FIG. 3 extends in a serpentine shape along the surface 241. The flow path 243 is not limited to this, and may extend in a comb-teeth shape or a spiral shape along the surface 241. The flow path 243 contains spaces formed by grooves and openings provided in the flow path plate 24, for example.

The flow path 243 has a plurality of regions 243c and a plurality of regions 243d. One of the regions 243c extends along an X-axis direction of the surface 241. One of the regions 243d extends so as to turn back from one of the regions 243c along the surface 241. Another of the regions 243c extends along the X-axis direction of the surface 241 from the region 243d.

A length in the X-axis direction of an overlap of the surface 241 and the surface 23a2 or the surface 23b2 is defined as L1. A length in a Y-axis direction of the overlap of the surface 241 and the surface 23a2 or the surface 23b2 is defined as L2. A length in the X-axis direction of an overlap of the surface 23a2 or the surface 23b2 and the flow path 243 is defined as L3. A length in the Y-axis direction of the overlap of the surface 23a2 or the surface 23b2 and the flow path 243 is defined as L4. A length of the region 243c is defined as L5. An average width of the region 243c is defined as L6. A length of the region 243d is defined as L7. An average width of the region 243d is defined as L8. An average width between one of the regions 243c and another of the regions 243c is defined as L9. The shortest distance between an end portion in the X-axis direction of the overlap of the surface 241 and the surface 23a2 or the surface 23b2 and the flow path 243 is defined as L10. The shortest distance between an end portion in the Y-axis direction of the overlap of the surface 241 and the surface 23a2 or the surface 23b2 and the flow path 243 is defined as L11. A depth in a Z-axis direction of the flow path 243 is defined as L12.

A ratio of an area of an overlap of the surface 23a2 and the flow path 243 to an area of the surface 23a3 is preferred to be 0.5 or more and 0.85 or less. Further, a ratio of an area of an overlap of the surface 23b2 and the flow path 243 to an area of the surface 23b2 is preferred to be 0.5 or more and 0.85 or less.

As the amount of gas changes due to the reaction between the vicinity of the inflow port 243a and the vicinity of the outflow port 243b, a flow speed changes in some cases. In contrast to this, for example, the width of the flow path 243 is tapered toward the outflow port 243b, or the number of branches of the flow path 243 in parallel connection is changed, thereby making it possible to increase uniformity of the entire reduction reaction of the cathode 23. When a value obtained by dividing an integrated value of the width of the flow path 243 with respect to the entire length of the flow path 243 by the above-described entire length is used as a mean value and a value obtained by dividing an integrated value of, with respect to the entire length of a region between one of the regions 243c and another of the regions 243c, a width of the above-described region by the above-described entire length is used as a mean value, the width of the above-described region is preferably smaller than the width of the flow path 243. This enables efficient supply of a carbon dioxide gas to the porous conductive layer 23a. However, when the above-described width is small extremely, the gas or the like becomes likely to be supplied through the above-described region rather than the flow path 243. A ratio of the average width of the region 243c of the flow path 243 (L6) to the average width between one of the regions 243c and another of the regions 243c (L9) is preferred to be 1.5 or more and 5 or less.

Although the flow path 243 can be formed variously, the carbon dioxide gas is supplied in an overlap of the flow path 243 and the porous conductive layer 23a. By changing the flow rate of the carbon dioxide gas and the flow path width, the flow speed is changed to adjust pressure or the like, resulting in an increase in partial pressure of the carbon dioxide. Further, discharges of the produced water and the water that has migrated from the oxidation side are also accelerated by circulation of the carbon dioxide gas. In the meantime, the mobility of the produced water and the water that has migrated from the oxidation side between the regions 243c is inferior to that in the region facing the flow path 243, and moisture amounts in the porous conductive layer 23a and of the reduction catalyst layer 23b are higher. From this viewpoint, when the area between the regions 243c is large, hydrogen generation is large and reduction performance of the carbon dioxide decreases. Further, when the width between the regions 243c is wide, discharge of water to the flow path 243 from a center portion between the regions 243c and a supply amount of the carbon dioxide to between the regions 243c from the flow path 243 decrease. Therefore, the hydrogen generation increases and cell performance decreases. Further, there are no adjacent flow paths in a region outside a region, of the reduction catalyst layer 23b and the porous conductive layer 23a, surrounding the outer periphery of the flow path 243, and therefore, when the width of the periphery between the regions 243c is large, an increase in production rate of the hydrogen results in a significant impact.

It is impossible to say that the region between one of the regions 243c and another of the regions 243c only needs to be narrow, and there is sometimes a case that the difference in pressure loss between the porous conductive layer 23a and the flow path 243 prevents the gas from flowing through the flow path 243 to make the gas flow through the above-described region easily. In this case, the surface uniformity of the reaction is impaired and the reaction efficiency of the electrochemical reaction device decreases. Furthermore, due to the small area of the above-described region, a contact area between the porous conductive layer 23a and the flow path plate 24 decreases, resulting in that a contact resistance increases and the reaction efficiency of the electrochemical reaction device decreases.

The area of the surface 23a2 is made larger than the area of the surface 23b2, thereby making it possible to facilitate uniform adjustment of the amounts of the gas and the moisture to the porous conductive layer 23a, so that it is possible to improve the reaction efficiency. However, when the area of the surface 23a2 is much larger than the area of the surface 23b2, the cell area becomes large, resulting in a decrease in the efficiency due to effects of cost, productivity, heat release, and the like.

Figure 5:
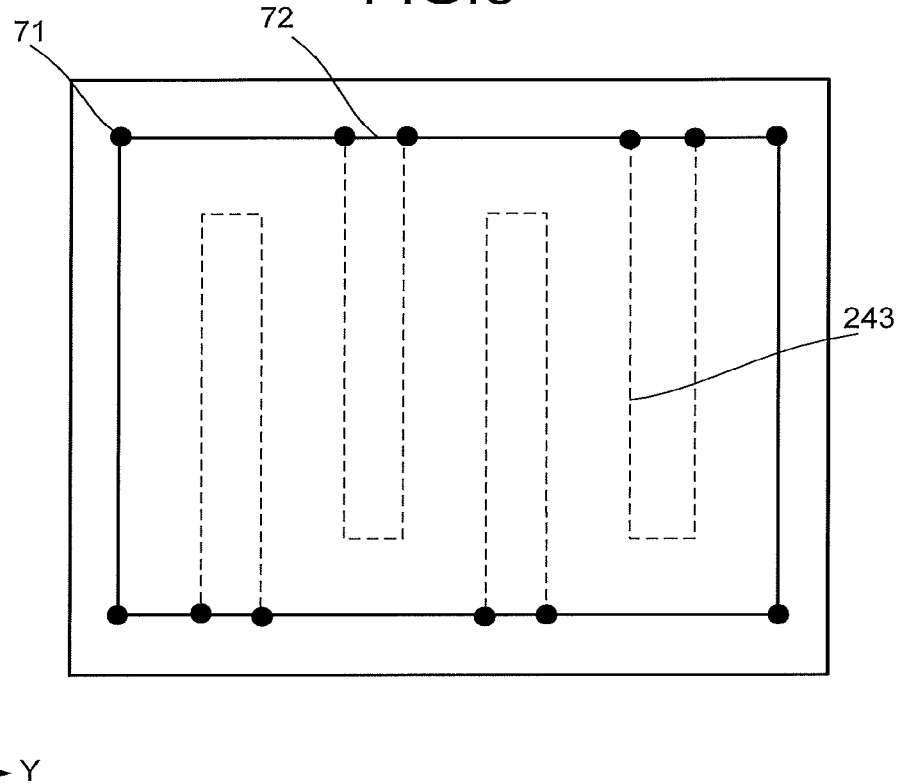
FIG. 5 is a schematic view for explaining a method of calculating an area of an overlap.

If the surface 23a2 is divided into a polygonal portion and a remainder portion, the polygonal portion is formed by connecting vertexes of the overlap of the surface 23a2 and the flow path 243, each of interior angles of the overlap thereof corresponding to the vertexes is less than 180 degrees, and a ratio of an area of the remainder portion to the area of the surface 23a2 is preferred to be 1/6 or less. FIG. 5 is a schematic view for explaining a method of calculating the area of an overlap. FIG. 5 illustrates vertexes 71, out of vertexes of the overlap, each having an interior angle of less than 180 degrees, and a polygon 72 formed by connecting the vertexes 71. Furthermore, a ratio of an area of the remainder of the surface 23b2 from which the overlap and the polygon 72 are removed to the area of the surface 23b2 is preferred to be 1/6 or less.

As a distance to the overlap of the surface 23a2 or the surface 23b2 and the flow path 243 is farther and farther from respective points of the overlap of the surface 23a2 or the surface 23b2 and the surface 241, the hydrogen rather than the carbon compound is produced by the reduction reaction dominantly. Further, when the overlap of the surface 23a2 or the surface 23b2 and the surface 241 includes a lot of portions far from the overlap of the surface 23a2 or the surface 23b2 and the flow path 243, the reduction performance of the carbon dioxide decreases. Thus, reducing a standard deviation of the shortest distances between respective points of the overlap of the surface 23a2 or the surface 23b2 and the surface 241 and the overlap of the surface 23a2 or the surface 23b2 and the flow path 243 enables an improvement in the reduction performance of the carbon dioxide.

Figure 6:
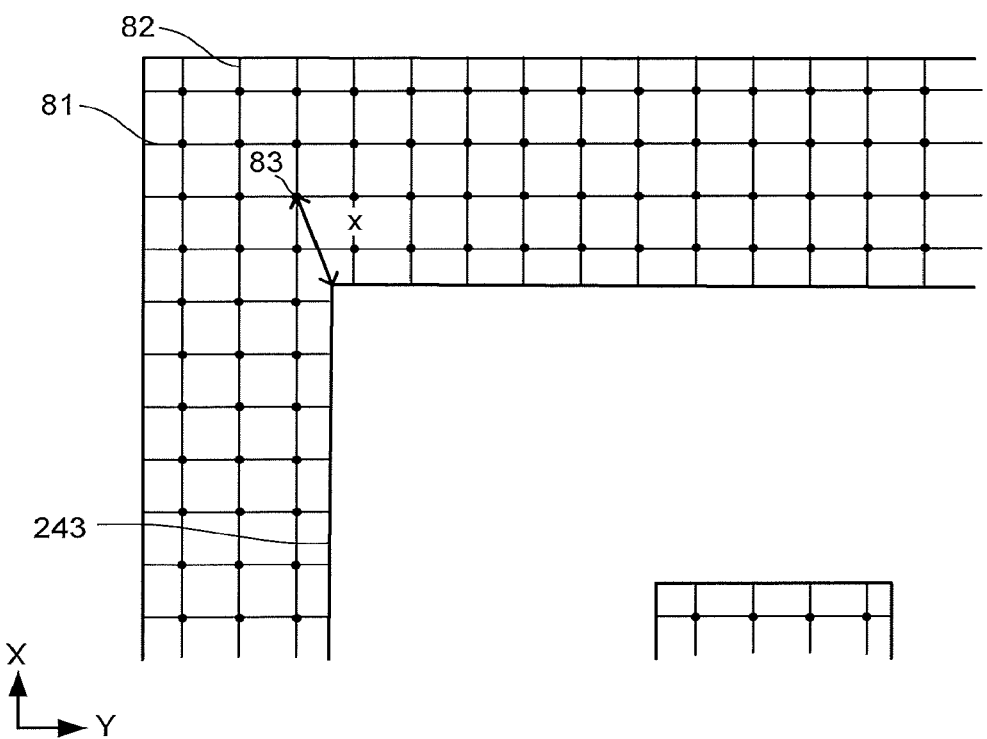
FIG. 6 is a view for explaining a method of calculating a standard deviation of the shortest distance.

The standard deviation of the shortest distance is preferred to be 0.8 or less. FIG. 6 is a view for explaining a method of calculating the standard deviation of the shortest distance. FIG. 6 illustrates: a plurality of parting lines 81 dividing the remainder of the overlap of the surface 23a2 or the surface 23b2 and the surface 241 from which the overlap of the surface 23a2 or the surface 23b2 and the flow path 243 is removed along the X-axis direction by 0.1 mm each; a plurality of parting lines 82 dividing the above-described remainder along the Y-axis direction by 0.1 mm each; a plurality of intersection points 83 of the parting lines 81 and the parting lines 82; and the shortest distance x between the intersection point 83 and the above-described overlap.

A standard deviation α is defined by calculating the square of the shortest distance x between the intersection point 83 and the above-described overlap at each intersection point 83 and calculating a square root of a value obtained by dividing the sum of the calculated squares of the shortest distances x by an intersection point number n. That is, the standard deviation α is expressed by the following expression (A).

[Mathematical expression 1]

$$\sigma = \sqrt{\frac{1}{n}\sum_{i=1}^{n} x^2} \qquad (A)$$

In the remainder of the overlap, the number of intersection points, at which the shortest distance x is 0.5 mm or more, is preferred to be 30% or less of a number n of all the intersection points 83.

The depth of the flow path 243 in the Z-axis direction is preferably shallow from the viewpoints of supplying the carbon dioxide to the porous conductive layer 23a, discharging the liquid, and performing the reaction uniformly on the cell surface. However, the flow path being narrow increases the pressure loss of the flow path, thereby causing an energy loss of the gas supply and flowing through not the flow path but the gas diffusion layer, and thereby the uniform reaction on the cell surface is prevented. Thus, an extremely narrow flow path is not preferred. The depth of the flow path 243 preferably falls within a range of 0.3 to 2 mm. When the depth is less than 0.3 mm, the porous conductive layer 23a digs into the flow path 243. Therefore, the actual width of the flow path becomes narrower, so that narrowing the flow path width and setting the depth to about 0.5 mm are preferred. When the flow path 243 has a too large depth, the gas supply deteriorates due to an effect of diffusion, so that the depth is preferred to be at least 2 mm or less.

As the first electrolytic solution and the second electrolytic solution, an aqueous solution containing, for example, $LiHCO_3$, $NaHCO_3$, $KHCO_3$, $CsHCO_3$, phosphoric acid, boric acid, or the like may be used. Further, as the first electrolytic solution and the second electrolytic solution, an aqueous solution containing, for example, an optional electrolyte can be used. Examples of the aqueous solution containing the electrolyte include aqueous solutions containing phosphoric acid ions ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), carbonate ions ($CO_3^-$), or the like. The first electrolytic solution and the second electrolytic solution may contain substances different from each other.

As the above-described electrolytic solutions, for example, an ionic liquid that is made of a salt of cations such as imidazolium ions or pyridinium ions and anions such as $BF_4^-$ or $PF_6^-$ and that is in a liquid state in a wide temperature range, or an aqueous solution thereof can be used. Other examples of the electrolytic solution include amine solutions of ethanolamine, imidazole, pyridine, and so on, and aqueous solutions thereof. Examples of the amine include primary amine, secondary amine, tertiary amine, and so on. These electrolytic solutions may have high ion conductivity, have a property of absorbing carbon dioxide, and have characteristics of decreasing reduction energy.

Examples of the primary amine include methylamine, ethylamine, propylamine, butylamine, pentylamine, hexylamine, and so on. A hydrocarbon of the amine may be substituted by alcohol or halogen. Examples of the amine whose hydrocarbon is substituted include methanolamine, ethanolamine, chloromethyl amine, and so on. Further, an unsaturated bond may exist. The same applies to hydrocarbons of the secondary amine and the tertiary amine.

Examples of the secondary amine include dimethylamine, diethylamine, dipropylamine, dibutylamine, dipentylamine, dihexylamine, dimethanolamine, diethanolamine, dipropanolamine, and so on. The substituted hydrocarbons may be different. The same applies to the tertiary amine. Examples of amine in which substituted hydrocarbons are different include methylethylamine, methylpropylamine, and so on.

Examples of the tertiary amine include trimethylamine, triethylamine, tripropylamine, tributylamine, trihexylamine, trimethanolamine, triethanolamine, tripropanolamine, tributanolamine, triexanolamine, methyldiethylamine, methyldipropylamine, and so on.

Examples of the cations of the ionic liquid include 1-ethyl-3-methylimidazolium ions, 1-methyl-3-propylimidazolium ions, 1-butyl-3-methylimidazole ions, 1-methyl-3-pentylimidazolium ions, 1-hexyl-3-methylimidazolium ions, and so on.

A second place of the imidazolium ion may be substituted. Examples of the cation having the imidazolium ion in which the second place is substituted include 1-ethyl-2,3-dimethylimidazolium ions, 1-2-dimethyl-3-propylimidazolium ions, 1-butyl-2,3-dimethylimidazolium ions, 1,2-dimethyl-3-pentylimidazolium ions, 1-hexyl-2,3-dimethylimidazolium ions, and so on.

Examples of the pyridinium ion include methylpyridinium, ethylpyridinium, propylpyridinium, butylpyridinium, pentylpyridinium, hexylpyridinium, and so on. In both of the imidazolium ion and the pyridinium ion, an alkyl group may be substituted, or an unsaturated bond may exist.

Examples of the anion include fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and so on. A dipolar ion in which the cation and the anion of the ionic liquid are coupled by hydrocarbons may be used. A buffer solution such as a potassium phosphate solution may be supplied to the flow paths.

The flow path plate 24 is preferred to be a metal plate containing a material having low chemical reactivity and high conductivity. As such a material, metal plates of Ti, SUS, and so on can be cited.

The current collector 25 is in contact with the surface 242 of the flow path plate 24. The current collector 25 preferably contains a material having low chemical reactivity and high conductivity. As such a material, metal materials such as Ti and SUS, carbon, and so on can be cited.

The separator 30 is formed of an ion exchange membrane or the like that enables ions to migrate between the anode part 10 and the cathode part 20 and separation between the anode 11 and the cathode 23. The ion exchange membrane allows specific ions to pass therethrough. Examples of the ion exchange membrane include Neosepta (registered trademark) manufactured by ASTOM Corporation, Selemion (registered trademark) and Aciplex (registered trademark) manufactured by Asahi Glass Co. Ltd., Fumasep (registered trademark) and fumapem (registered trademark) manufactured by Fumatech GmbH, Nafion (registered trademark), which is a fluorocarbon resin produced through polymerization of sulfonated tetrafluoroethylene, manufactured by Du Pont, lewabrane (registered trademark) manufactured by LANXESS, IONSEP (registered trademark) manufactured by IONTECH, Mustang (registered trademark) manufactured by Pall Corporation, ralex (registered trademark) manufactured by mega a.s., Gore-Tex (registered trademark) manufactured by W. L. Gore & Associates, and so on. Further, the ion exchange membrane may be formed of a film having a hydrocarbon basic skeleton or for anion exchange, may be formed of a film having an amine group.

When a solid electrolyte membrane is used as the electrolyte, the aforementioned Nafion, Selemion, or the like is used. Further, the electrolyte is not limited to the solid electrolyte membrane, and may be an electrolytic solution of alkali or the like. At this time, a narrow interval between the anode 11 and the cathode 23 is preferred because an electrical resistance becomes low, and further a uniform interval between the anode 11 and the cathode 23 is preferred because an electrical resistance to an electrode surface becomes uniform and the reaction efficiency becomes high. Therefore, a porous nonconductive membrane is preferably provided between the anode 11 and the cathode 23. This enables migration of the electrolyte through the porous body, the interval between the anode 11 and the cathode 23 is uniformized between several μm and several hundred μm, and separation of gas components present in the anode 11 and cathode 23 is enabled. As such a membrane, a water-repellent porous polymer such as Teflon, or a porous substance subjected to a water-repellent treatment such as Teflon is used.

When the ion exchange membrane is a proton exchange membrane, for example, migration of the hydrogen ions is enabled. Use of the ion exchange membrane being a solid polymer membrane such as Nafion can increase the migration efficiency of the ions. The ion exchange membrane is not necessarily provided, and a salt bridge such as agar may be provided in place of the ion exchange membrane, or a porous body thin film may be used.

The power supply 40 is electrically connected to the anode 11 and the cathode 23. With use of the electric energy supplied from the power supply 40, the reduction reaction by the cathode 23 and the oxidation reaction by the anode 11 are performed. For example, a wire may connect the power supply 40 and the anode 11 and connect the power supply 40 and the cathode 23. The power supply 40 includes a photoelectric conversion element, a system power supply, a power supply device such as a storage battery, or a conversion unit that converts renewable energy such as wind power, water power, geothermal power, or tidal power into electric energy. For example, the photoelectric conversion element has a function of separating charges using energy of irradiating light such as sunlight. Examples of the photoelectric conversion element include a pin-junction solar cell, a pn-junction solar cell, an amorphous silicon solar cell, a multijunction solar cell, a single crystal silicon solar cell, a polycrystalline silicon solar cell, a dye-sensitized solar cell, an organic thin-film solar cell, and so on.

Next, there will be explained an operation example of the electrochemical reaction device according to the embodiment. Here, the case where the gas containing carbon dioxide is supplied through the flow path 243 to produce carbon monoxide is explained as one example. In the anode part 10, as expressed by the following formula (1), the water undergoes an oxidation reaction and loses electrons, and oxygen and hydrogen ions are produced. At least one of the produced hydrogen ions migrates to the cathode part 20 through the separator 30.

$$2H_2O \rightarrow 4H^+ + O_2 + 4e^- \quad (1)$$

In the cathode part 20, as expressed by the following formula (2), the carbon dioxide undergoes a reduction reaction, and the hydrogen ions react with the carbon dioxide while receiving the electrons, and carbon monoxide and water are produced. Further, as expressed by the following formula (3), the hydrogen ions receive the electrons, and hydrogen is produced. At this time, the hydrogen may be produced simultaneously with the carbon monoxide.

$$CO_2 + 2H^+ + 2e^- \rightarrow CO + H_2O \quad (2)$$

$$2H^+ + 2e^- \rightarrow H_2 \quad (3)$$

The power supply 40 needs to have an open-circuit voltage equal to or more than a potential difference between a standard oxidation-reduction potential of the oxidation reaction and a standard oxidation-reduction potential of the reduction reaction. For example, the standard oxidation-reduction potential of the oxidation reaction in the formula (1) is 1.23 [V]. The standard oxidation-reduction potential of the reduction reaction in the formula (2) is 0.03 [V]. The standard oxidation-reduction potential of the reduction reaction in the formula (3) is 0 [V]. At this time, the open-circuit voltage needs to be 1.26 [V] or more in the reactions of the formula (1) and the formula (2).

As for the ion exchange membrane between the anode and the cathode, the carbon dioxide gas, carbonate ions, hydrogen carbonate ions, and so on sometimes impair the ion exchange membrane. Adjustment of the amount of carbon dioxide gas and the amount of vapor at this time enables extension of the life of the ion exchange membrane. However, under a condition of the hydrogen ions being present abundantly, generation of hydrogen occurs. Therefore, even with too many ions, applied energy is not used for the reduction reaction of the carbon dioxide, resulting in a decrease in reduction efficiency of the carbon dioxide. Therefore, it is necessary to maintain a balance between the amount of hydrogen ions required for the reduction of the carbon dioxide and suppression of the hydrogen generation.

The reduction reactions of hydrogen ions and carbon dioxide are reactions consuming hydrogen ions. This means that a small amount of the hydrogen ions results in low efficiency of the reduction reaction. Therefore, the first electrolytic solution and the second electrolytic solution preferably have different hydrogen ion concentrations so that the concentration difference facilitates the migration of the hydrogen ions. The concentration of anions (for example, hydroxide ions) may be made different between the electrolytic solution on the anode side and the electrolytic solution on the cathode side. When using a cation-exchange membrane as the ion exchange membrane, cations migrate, and when using an anion-exchange membrane as the ion exchange membrane, anions migrate. Further, in order to increase the concentration difference of the hydrogen ions, a method is considered, in which an inert gas not containing carbon dioxide (nitrogen, argon, or the like) is directly blown into the electrolytic solution, for example, to let the carbon dioxide contained in the electrolytic solution go, to thereby reduce the concentration of the hydrogen ions.

The reaction efficiency of the formula (2) varies depending on the concentration of the carbon dioxide dissolved in the electrolytic solution. The higher the concentration of the carbon dioxide, the higher the reaction efficiency, and as the former is lower, the latter is lower. The reaction efficiency of the formula (2) also varies depending on the concentration of the carbon dioxide and the vapor amount. As for these reactions, the porous conductive layer 23a is provided between the reduction catalyst layer 23b and the flow path 243 and the carbon dioxide is suppled through the porous conductive layer 23a, thereby making it possible to increase the concentration of the carbon dioxide in the electrolytic solution. Although the carbon dioxide is introduced into the flow path 243 in a gaseous form and the carbon dioxide is supplied to the reduction catalyst, by the water migrating from the anode 11 and the water produced by the reaction, the concentrations of the carbon dioxide and the water in the reduction catalyst layer 23b vary.

Unless a liquid component produced when reducing the carbon dioxide is efficiently discharged to the outside of the cathode part 20, the porous conductive layer 23a and the reduction catalyst layer 23b are sometimes clogged with the liquid component to decrease the reaction efficiency. For example, when such an electrode material as a perforated metal or an expanded metal, which is often used for the cathode 23, is used to form a type of obtaining both performances of gas and current collection, a decrease in the reaction efficiency is caused. Thus, the electrochemical reaction device according to this embodiment has a composition in which a flow path plate having a narrow tubular flow path is used and the generated liquid component is forced out by the flow path to be discharged. The flow path is formed by a plurality of flow paths disposed in parallel, a serpentine shaped flow path, or a combination thereof. Further, a distribution of the flow path with respect to a reaction surface is preferred to be uniform so that a uniform reaction can be performed on the cell surface.

The reduction catalyst for reducing the carbon dioxide varies in selectivity depending on the electrolyte, electrolyte membrane, or vapor pressure that is in contact therewith, and reduces the carbon dioxide to produce carbon monoxide, formic acid, ethylene, methane, and the like, but reduces protons depending on a condition to produce a large amount of hydrogen, resulting in a decrease in reduction efficiency of the carbon dioxide. This is because a proton source used for the reduction of the carbon dioxide is hydrogen ions or hydrogen carbonate ions, and the selectivity changes depending on, for example, the concentration of the hydrogen carbonate ions in the electrolytic solution or the pH. This change greatly affects the selectivity of carbon monoxide and hydrogen in a catalyst mainly using gold, and in a catalyst to perform a multielectron reduction of copper and the like, selectivities of carbon monoxide, formic acid, ethylene, methane, methanol, ethanol, formaldehyde, acetone, and so on are different from one another. Selecting the electrolytic solution becomes important for performing these controls. However, when the catalyst layer is in contact with the electrolyte membrane (or the electrolytic solution on the oxidation side) in order to reduce a cell resistance in the system of supplying the carbon dioxide gas to the reduction catalyst, the electrolytic solution is determined by compatibility with the oxidation catalyst, a cell resistance, or a balance of a composition of the electrolyte membrane, or the like with members forming the cell, so that it is difficult to select an optional electrolytic solution.

However, when the catalyst layer is in contact with the electrolyte membrane (or the electrolytic solution on the anode side) in order to reduce a cell resistance in the system of supplying the carbon dioxide gas to the reduction catalyst, the electrolytic solution is determined by compatibility with the oxidation catalyst, a cell resistance, or a balance of a composition of the electrolyte membrane, or the like with members forming the cell, so that it is difficult to select an optional electrolytic solution. Thus, changing the flow path structure also makes it possible to adjust the concentrations of the carbon dioxide and the water in the catalyst layer.

The production is not focused only on the reduction of carbon dioxide, and a reduced substance of carbon dioxide and hydrogen can also be produced at an arbitrary ratio in such a manner that, for example, carbon monoxide and hydrogen are produced at a ratio of 1:2, and through a chemical reaction performed thereafter, methanol is manufactured. The hydrogen is relatively easily obtainable by electrolyzing water, or is a fossil fuel-derived inexpensive raw material that is easily obtainable, so that the ratio of the hydrogen does not need to be large. Further, using the carbon dioxide as a raw material also contributes to a warming reduction effect, and thus when only the carbon monoxide can be reduced, environmental properties improve, but it is still difficult to efficiently cause a reaction. From the viewpoints of reaction efficiency, achievability, and a rate of the electrolyzing, a ratio of the carbon monoxide to the hydrogen is at least 1 or more and desirably 1.2 or more, and the ratio of 1.5 or more is preferred from the viewpoints of economic efficiency, environmental properties, and achievability.

Figure 7:
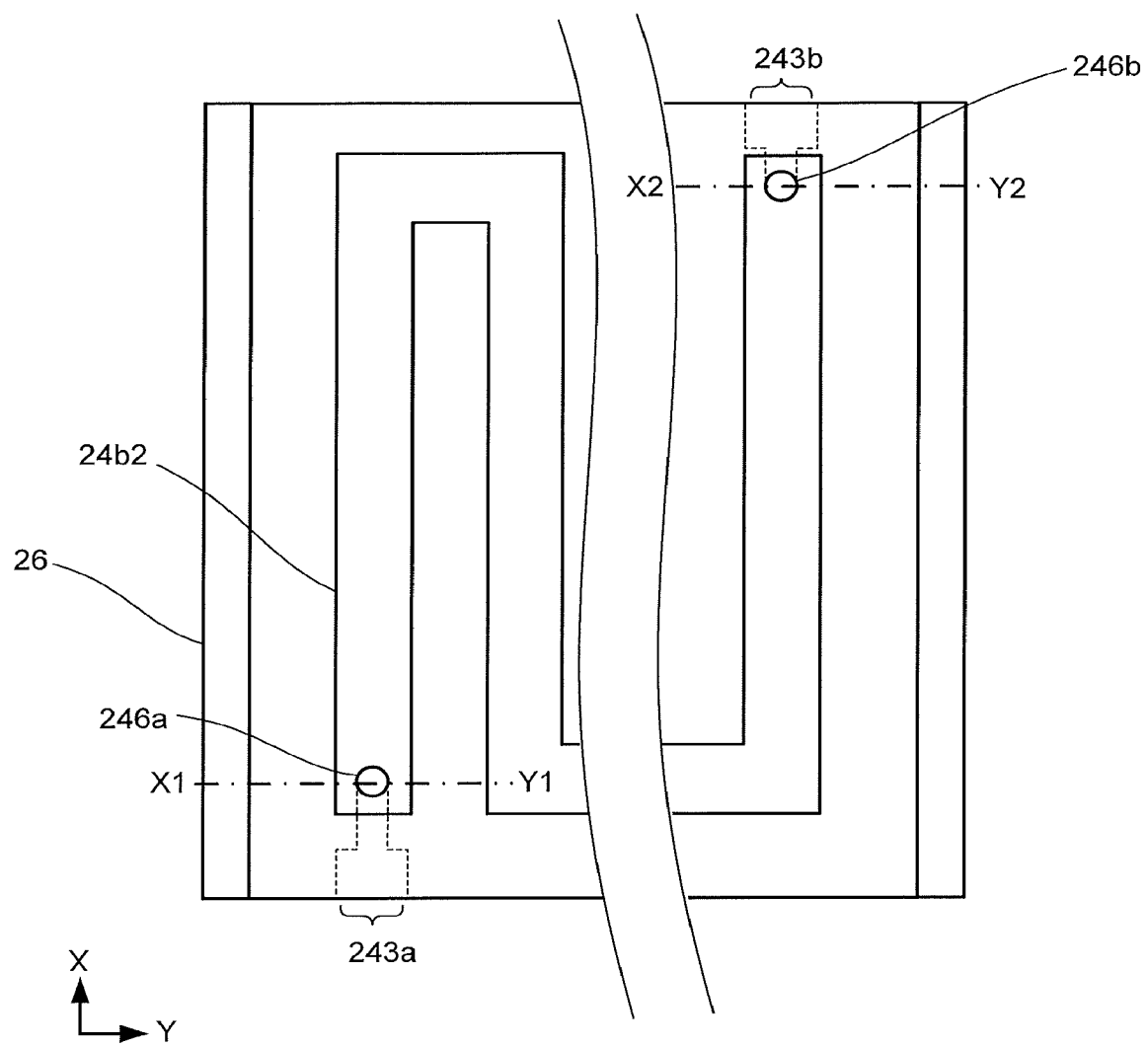
FIG. 7 is a schematic top view illustrating another structure example of the flow path plate.
Figure 8:
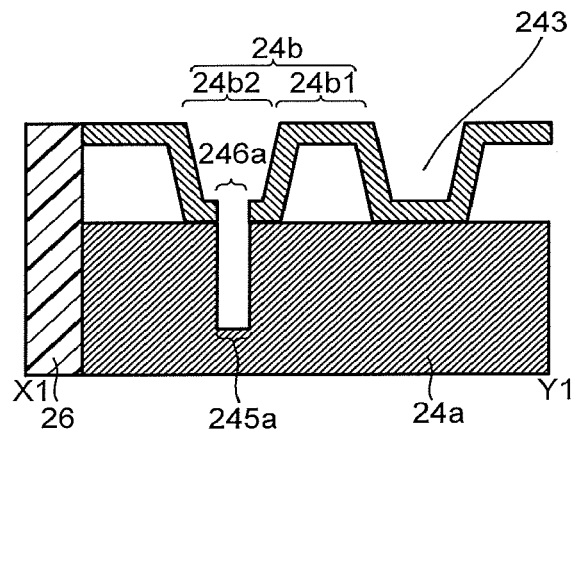
FIG. 8 is a schematic cross-sectional view illustrating another structure example of the flow path plate.
Figure 9:
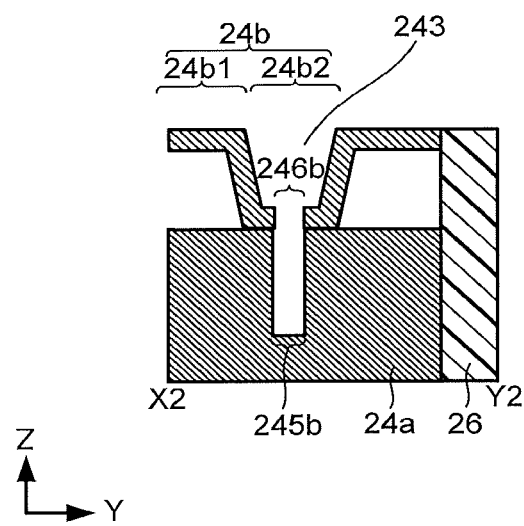
FIG. 9 is a schematic cross-sectional view illustrating another structure example of the flow path plate.

The structure of the flow path plate 24 is not limited to the structure examples illustrated in FIG. 1 to FIG. 6. FIG. 7 is a schematic top view of another structure example of the flow path plate 24. FIG. 8 is a schematic cross-sectional view of a line segment X1-Y1 in FIG. 7. FIG. 9 is a schematic cross-sectional view of a line segment X2-Y2 in FIG. 7. In FIG. 7 to FIG. 9, portions common to the structures illustrated in FIG. 1 to FIG. 6 can be assisted by the explanations in FIG. 1 to FIG. 6 as necessary.

The flow path plate illustrated in FIG. 7 to FIG. 9 includes a flow path layer 24a and a flow path layer 24b stacked on the flow path layer 24a. For the flow path layer 24a and the flow path layer 24b, high corrosion-resistant titanium, or the like can be used, but due to the relationship with press workability, price, or the like, working such as gold plating on a pressed plate of aluminum, SUS, or the like, conductive SUS for a high corrosion-resistant fuel cell, and the like may be used.

The flow path layer 24a includes the inflow port 243a, the outflow port 243b, an opening 245a, and an opening 245b. The inflow port 243a and the outflow port 243b are each provided to be exposed on a side surface of the flow path layer 24a.

The opening 245a penetrates the flow path layer 24a to communicate with the inflow port 243a. The opening 245b penetrates the flow path layer 24a to communicate with the outflow port 243b. The opening 245a and the opening 245b each may be formed by a groove.

The flow path layer 24b has a region 24b1 apart from the flow path layer 24a and a region 24b2 bent so as to project toward the flow path layer 24a from the region 24b1. The region 24b1 may have therein an opening through which the flow path layer 24b penetrates.

The region 24b2 has an opening 246a and an opening 246b. The opening 246a communicates with the inflow port 243a through the opening 245a. The opening 246b communicates with the outflow port 243b through the opening 245b.

In the flow path plate illustrated in FIG. 7 to FIG. 9, side surfaces of the flow path layer 24a and the flow path layer 24b are sealed by a sealing member 26. At this time, the flow path 243 contains a space between the region 24b2 and the porous conductive layer 23a of the cathode 23.

Figure 10:
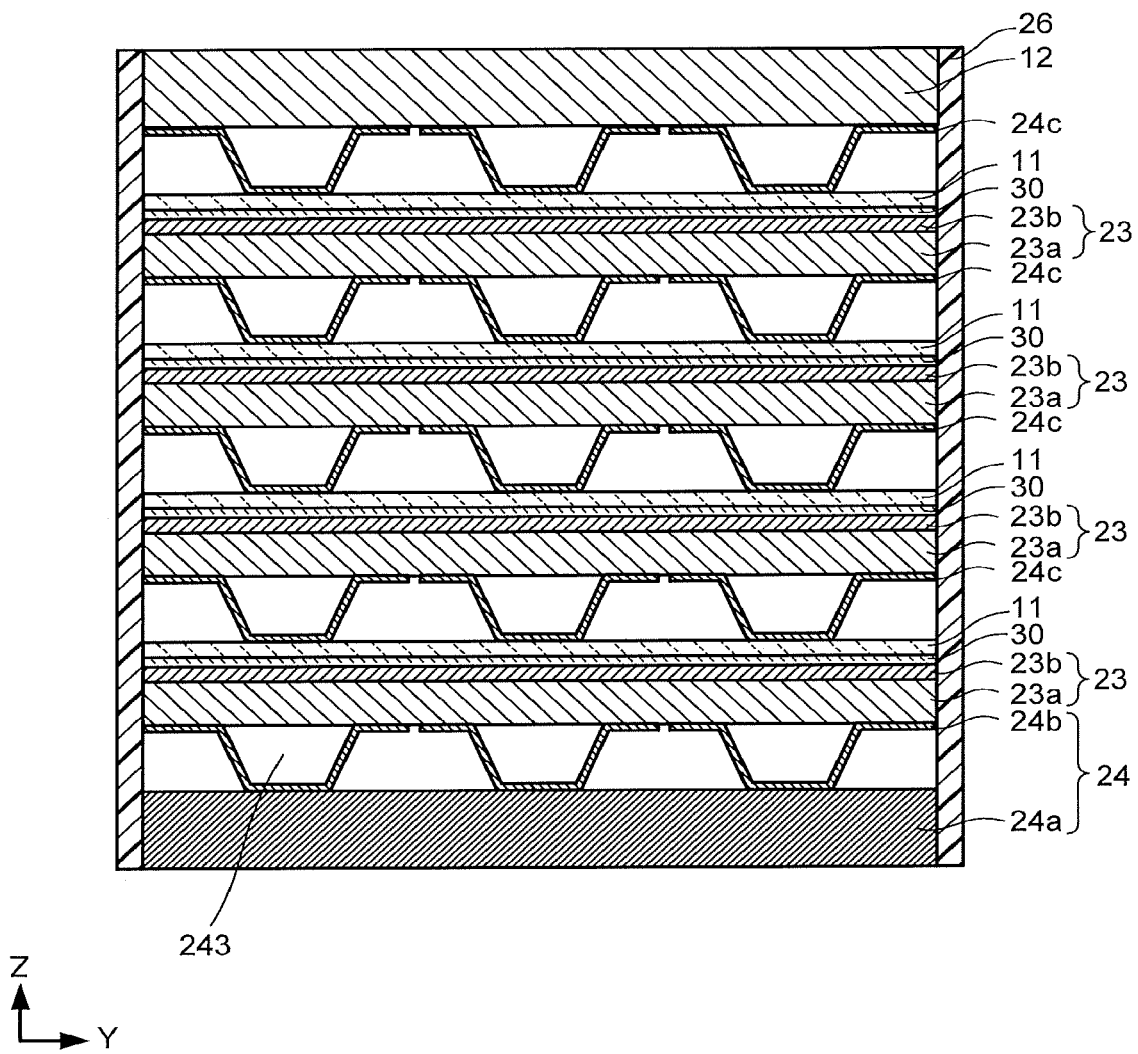
FIG. 10 is a schematic cross-sectional view illustrating another structure example of the flow path plate.

FIG. 10 is a schematic cross-sectional view illustrating another structure example of the electrochemical reaction device. The electrochemical reaction device illustrated in FIG. 10 includes a plurality of anodes 11, a flow path plate 12, a plurality of cathodes 23 each having a porous conductive layer 23a and a reduction catalyst layer 23b, a flow path plate 24 having a flow path layer 24a and a flow path layer 24b, a plurality of flow path layers 24c, a plurality of separators 30, and a sealing member 26. In FIG. 10, a plurality of units each including the anode 11, the cathode 23, the separator 30, and the flow path layer 24c are stacked. Parts common to the electrochemical reaction device explained with reference to FIG. 1 to FIG. 9 can be assisted by the explanations as necessary.

One of the anodes 11 is provided between one of the cathodes 23 and the flow path plate 12. One of the cathodes 23 is provided between the above-described one of the anodes 11 and one of the flow path plates 24c. One of the separators 30 separates the above-described one of the anodes 11 from the above-described one of the cathodes 23. One of the flow path layers 24c is provided between another of the cathodes 23 and the above-described one of the anodes 11. Further, though not illustrated, the plural anodes 11 and the plural cathodes 23 are electrically connected to a power supply 40.

The flow path plate 12 may be electrically connected to the power supply 40 via a current collector 13 similarly to the electrochemical reaction device illustrated in FIG. 1, for example. The porous conductive layer 23a faces the flow path layer 24c. The reduction catalyst layer 23b faces the separator 30.

The flow path layer 24a faces the porous conductive layer 23a. The flow path layer 24a may be electrically connected to the power supply 40 via a current collector 25 similarly to the electrochemical reaction device illustrated in FIG. 1, for example. The flow path layer 24b is stacked on the flow path layer 24a. A region 24b1 of the flow path layer 24b has therein an opening through which the flow path layer 24b penetrates. For the flow path layer 24c, a flow path layer having the same structure as the flow path layer 24a, for example, can be used. Further, the electrochemical reaction device illustrated in FIG. 10 may have a structure in which the openings 246a, 246b of the flow path layer 24a are not provided and the region 24b2 extends to an end portion of the flow path layer 24c. At this time, carbon dioxide or an electrolytic solution may be directly supplied to the flow path 243 from the end portion of the flow path layer 24c. The flow path layer 24c is also referred to as a bipolar plate. Further, the sealing member 26 seals a stack of the above-described units.

In the electrochemical reaction device illustrated in FIG. 10, an electrolytic solution on the anode 11 side and an electrolytic solution on the cathode 23 side can be made common, and further flow paths through which the electrolytic solution flows can be made common. For example, the same flow path layer 24c can be used as the flow path on the anode 11 side and the flow path on the cathode 23 side, and can also be used as a flow path on the cathode 23 side by having openings formed therein like the aforementioned flow path. Such a formation is preferred because the contact resistance between the anode 11 and the cathode 23 is reduced to improve the efficiency. Further, this formation is good because a cost reduction and a reduction in size and weight can be achieved by reducing the number of parts.

EXAMPLE

Examples 1A, 1B, 2A, 2B, 3A, 3B, 4, 5, Comparative Examples 1, 2

A cell of an electrochemical reaction device in this example was fabricated as follows. An anode was formed by forming an oxidation catalyst containing an iridium oxide on a surface of a titanium-made wire mesh having a mesh structure by an etching method. Further, a cathode was fabricated by spraying 23 wt % of gold-carrying carbon onto a stack composed of a first porous conductive layer and a second porous conductive layer formed of a carbon paper to fabricate a catalyst layer-attached carbon paper with a gold-carrying amount being 0.2 mg/cm$^2$. The anode and the cathode were stacked with an ion exchange membrane (Nafion115) provided therebetween to fabricate a structure (catalyst area 400 mm$^2$).

A flow path plate on the cathode side was formed of conductive titanium. At a turned portion of a flow path, the flow path branches off into two in parallel connection. The number of branches at the turned portion is defined as a branch number, some of the branches including a confluence.

Values of respective parameters of flow path plates in Examples and Comparative examples are illustrated in Table 1. In Table 1, a reciprocation number means the number of turnbacks of the flow path. The reciprocation number being 1.5 means that the flow path extends so as to make two turnbacks. Further, the reciprocation number being 2.5 means that the flow path extends so as to make four turnbacks.

A flow path plate overlap length X indicates a length in the X-axis direction of an overlap of the flow path plate and the first or second porous conductive layer (corresponding to L1 in FIG. 3). A flow path plate overlap length Y indicates a length in the Y-axis direction of the overlap of the flow path plate and the first or second porous conductive layer (corresponding to L2 in FIG. 3). A flow path overlap length X indicates a length in the X-axis direction of an overlap of the flow path and the first or second porous conductive layer (corresponding to L3 in FIG. 3). A flow path overlap length Y indicates a length in the Y-axis direction of the overlap of the flow path and the first or second porous conductive layer (corresponding to L4 in FIG. 3). An overlap remainder length indicates the difference between the flow path plate overlap length Y and the flow path overlap length Y (corresponding to L2-L4). A flow path extended portion width indicates an average width of an extended portion of the flow path (corresponding to L6 in FIG. 3). A flow path turned portion width indicates an average width of the turned portion of the flow path (corresponding to L8 in FIG. 8). An inter-extended portion width indicates a width between one of the extended portions of the flow path and another of them (corresponding to L9 in FIG. 3). A flow path width ratio indicates a ratio of the extended portion width to the inter-extended portion width (corresponding to L6/L9). A flow path plate overlap end width X indicates the narrowest width between an end portion in the X-axis direction of a flow path plate overlap and a flow path overlap (corresponding to L10 in FIG. 3). A flow path plate overlap end width Y indicates the narrowest width between an end portion in the Y-axis direction of the flow path plate overlap and the flow path overlap (corresponding to L11 in FIG. 3).

A flow path cross-sectional area is obtained by the product (corresponding to L6×L12) of the width of the extended portion of the flow path and a depth of the flow path (corresponding to L12 in FIG. 3). A flow path overlap area indicates an area of the overlap of the flow path and the first or second porous conductive layer. The flow path overlap area is a value calculated by considering a curvature radius R of a corner of the flow path and defining a flow path shape. Concretely, the flow path overlap area is calculated by considering an angle of a corner with respect to the sum of a first area defined by the product of the length (L5) and the width (L6) of the extended portion of the flow path and a second area defined by the product of the length (L7) and the width (L8) of the turned portion.

An overlap remainder area indicates an area of the remainder of the overlap of the flow path plate and the first or second porous conductive layer from which the flow path overlap is removed. The overlap remainder area is a value obtained by subtracting an area of a polygon formed by connecting, out of vertexes of the overlap of the flow path and the first or second porous conductive layer, the vertexes each having an interior angle of less than 180 degrees from an area of the overlap. In this example, due to the first porous conductive layer and the second porous conductive layer both having one surface area of 400 mm$^2$, the value obtained by subtracting the area of the above-described polygon from 400 mm$^2$ was set as the value of the overlap remainder area.

A standard deviation α was calculated from a square root of a value obtained in a manner that the square of the shortest distance x between each of a plurality of intersection points of a plurality of first parting lines dividing the remainder of the flow path plate overlap from which the flow path overlap is removed along the X-axis direction by 0.1 mm each and a plurality of second parting lines dividing the above-described remainder along the Y-axis direction by 0.1 mm each and the overlap was calculated at each intersection point and the sum of the calculated squares of the shortest distances x was divided by an intersection point number n.

A number ratio indicates a number ratio of the number of intersection points, at which the shortest distance x is 0.5 mm or more, to the number n of all intersection points 83. An area ratio indicates a ratio of an area of the overlap to an area of the overlap.

The flow path plate on the anode side is formed of conductive titanium. The flow path on the anode side extends along a contact surface with the carbon paper so as to make four turnbacks. The flow path has a structure similar to that of the flow path on the cathode side in a structure having nothing between the extended portions. The above-described structure was held sandwiched between the flow path plate on the anode side and the flow path plate on the cathode side to fabricate a cell of the electrochemical reaction device.

As an electrolytic solution, a 1.0 M potassium hydroxide solution was supplied to the flow path on the oxidation side of this cell at a flow rate of 0.6 sccm. A carbon dioxide gas was supplied to the flow path on the reduction side at a flow rate of 30 sccm. A 2.5 V voltage was applied between the anode and the cathode of this cell to collect gas generated from the cathode side, to then measure conversion efficiency of the carbon dioxide. Further, the generated gas was sampled and the quantity of the gas was identified and determined by gas chromatography. A current value on this occasion was measured by an ammeter. The current value, a partial current of carbon monoxide calculated from a generation amount of carbon monoxide, a partial current of hydrogen calculated from a generation amount of hydrogen, Faraday's efficiency of the carbon monoxide, Faraday's efficiency of the hydrogen, a production amount ratio of the carbon monoxide to the hydrogen ($CO/H_2$), and so on are illustrated in Table 1.

Figure 11:
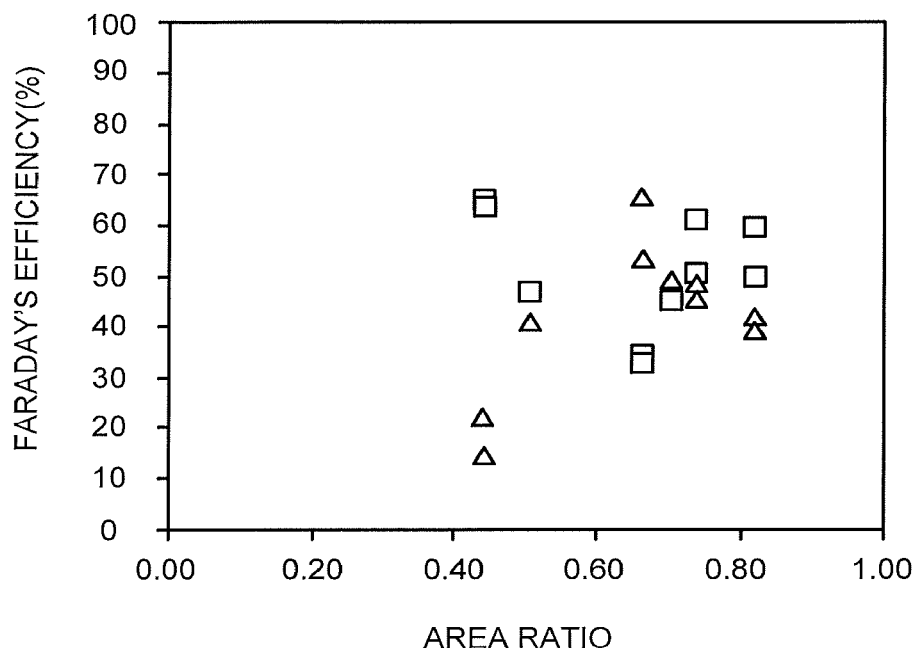
FIG. 11 is a view illustrating the relationship between an area ratio and Faraday's efficiency.

FIG. 11 is a view illustrating the relationship between an area ratio of an area of an overlap of the first or second porous conductive layer and the flow path to an area of an overlap of the first or second porous conductive layer and the flow path plate and the Faraday's efficiency. In FIG. 11, each square mark indicates the relationship between the area ratio and the Faraday's efficiency of the hydrogen, and each triangle mark indicates the relationship between the area ratio and the Faraday's efficiency of the carbon monoxide.

Figure 12:
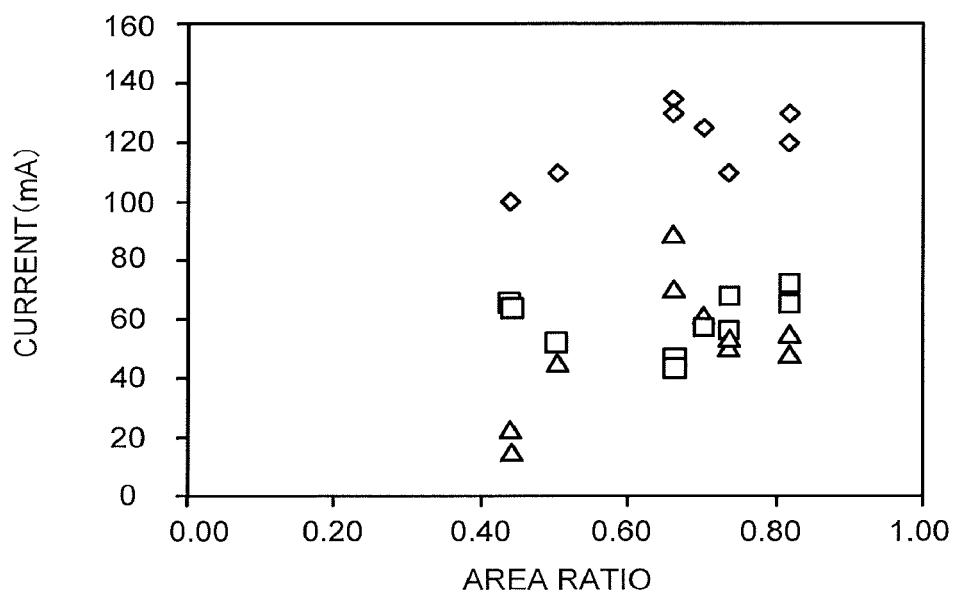
FIG. 12 is a view illustrating the relationship between the area ratio and an overall current or a partial current.

FIG. 12 is a view illustrating the relationship between the above-described area ratio and the overall current or the partial current. In FIG. 12, each square mark indicates the relationship between the area ratio and the partial current of the hydrogen, each triangle mark indicates the relationship between the area ratio and the partial current of the carbon monoxide, and each rhombus mark indicates the relationship between the area ratio and the overall current.

As illustrated in FIG. 11 and FIG. 12, when the area ratio is about 0.65, the Faraday's efficiency of the hydrogen, the Faraday's efficiency of the carbon monoxide, a Faraday's efficiency ratio, the overall current, and the partial current of the carbon monoxide each exhibit a high value, and the area ratio needs to be 0.5 or more in order for the overall current value to be greater than 100 mA. A high current density per area means a high reaction density and high cell performance efficiency. Furthermore, when the area ratio is 0.5 or more and 0.85 or less, the partial current of the carbon monoxide becomes 45 mA or more, and further when the

TABLE 1

| | Example 1A | Example 1B | Example 2A | Example 2B | Example 3A | Example 3B | Example 4 | Example 5 | Comparative Example 1 | Comparative Example 2 |
|---|---|---|---|---|---|---|---|---|---|---|
| Flow Path Reciprocation Number [Time] | 2.5 | 2.5 | 2.5 | 2.5 | 2.5 | 2.5 | 2.5 | 1.5 | 1.5 | 1.5 |
| Flow Path Plate Overlap Length X (L1) [mm] | 20 | 20 | 20 | 20 | 20 | 20 | 20 | 20 | 20 | 20 |
| Flow Path Plate Overlap Length Y (L2) [mm] | 20 | 20 | 20 | 20 | 20 | 20 | 20 | 20 | 20 | 20 |
| Flow Path Overlap Length X (L3) [mm] | 19 | 19 | 19 | 19 | 19 | 19 | 19 | 19 | 17 | 17.2 |
| Flow Path Overlap Length Y (L4) [mm] | 18.6 | 18.6 | 18.8 | 18.8 | 19.3 | 19.3 | 19.4 | 19 | 16.5 | 18.4 |
| Overlap Remainder Length (L2 − L4) [mm] | 1.4 | 1.4 | 1.2 | 1.2 | 0.7 | 0.7 | 0.6 | 1 | 3.5 | 1.6 |
| Flow Path Extended Portion Width (L6) [mm] | 1.5 | 1.5 | 1.7 | 1.7 | 1.3 | 1.3 | 1.4 | 1.5 | 1.5 | 1.4 |
| Flow Path Turned Portion Width (L8) [mm] | 2 | 2 | 2 | 2 | 2 | 2 | 2 | 2 | 2 | 2 |
| Inter-Extended Portion Width (L9) [mm] | 0.40 | 0.40 | 0.20 | 0.20 | 0.70 | 0.70 | 0.60 | 2.00 | 1.50 | 1.40 |
| Flow Path Width Ratio (L6/L9) | 3.75 | 3.75 | 8.5 | 8.5 | 1.86 | 1.86 | 2.33 | 0.75 | 1 | 0.7 |
| Flow Path Plate Overlap End Width X (L10) [mm] | 0.5 | 0.5 | 0.5 | 0.5 | 0.5 | 0.5 | 0.5 | 0.5 | 1.5 | 1.4 |
| Flow Path Plate Overlap End Width Y (L11) [mm] | 0.7 | 0.7 | 0.6 | 0.6 | 0.35 | 0.35 | 0.3 | 0.5 | 1.75 | 0.8 |
| Flow Path Cross-Sectional Area [$mm^2$] | 3 | 3 | 3.4 | 3.4 | 2.6 | 2.6 | 2.8 | 3 | 3 | 2.8 |
| Flow Path Overlap Area [$mm^2$] | 293.6 | 293.6 | 326 | 326 | 264 | 280 | 264 | 200.4 | 175.3 | 174.8 |
| Overlap Remainder Area [$mm^2$] | 23.3 | 23.3 | 21.4 | 21.4 | 16.65 | 15.7 | 16.65 | 19.5 | 59.75 | 41.76 |
| Standard Deviation σ | 0.679 | 0.679 | 0.695 | 0.695 | 0.663 | 0.663 | 0.663 | 0.729 | 0.906 | 0.796 |
| Number Ratio [%] | 6 | 6 | 6 | 6 | 0 | 0 | 0 | 0 | 59.75 | 33 |
| Area Ratio | 0.734 | 0.734 | 0.815 | 0.815 | 0.66 | 0.66 | 0.701 | 0.501 | 0.438 | 0.437 |
| Overall Current [mA] | 110 | 110 | 120 | 130 | 130 | 135 | 125 | 110 | 100 | 100 |
| $H_2$ Partial Current [mA] | 68 | 56 | 72 | 66 | 43 | 57 | 47 | 52 | 64 | 66 |
| Co Partial Current (mA) | 54 | 51 | 48 | 55 | 70 | 89 | 62 | 46 | 15 | 23 |
| $H_2$ Faraday's Efficiency [%] | 62 | 51 | 60 | 51 | 33 | 35 | 46 | 47 | 64 | 66 |
| Co Faraday's Efficiency [%] | 49 | 46 | 40 | 43 | 54 | 49 | 66 | 42 | 15 | 23 |
| Production Amount Ratio | 0.8 | 0.9 | 0.67 | 0.84 | 1.64 | 1.9 | 1.08 | 0.88 | 0.23 | 0.35 | area ratio is 0.5 or more and 0.85 or less, the practical Faraday's efficiency becomes 40% or more and $CO/H_2$ becomes 0.6 or more, which indicates that the area ratio needs to be 0.5 or more and 0.85 or less from the practical viewpoint.

Figure 13:
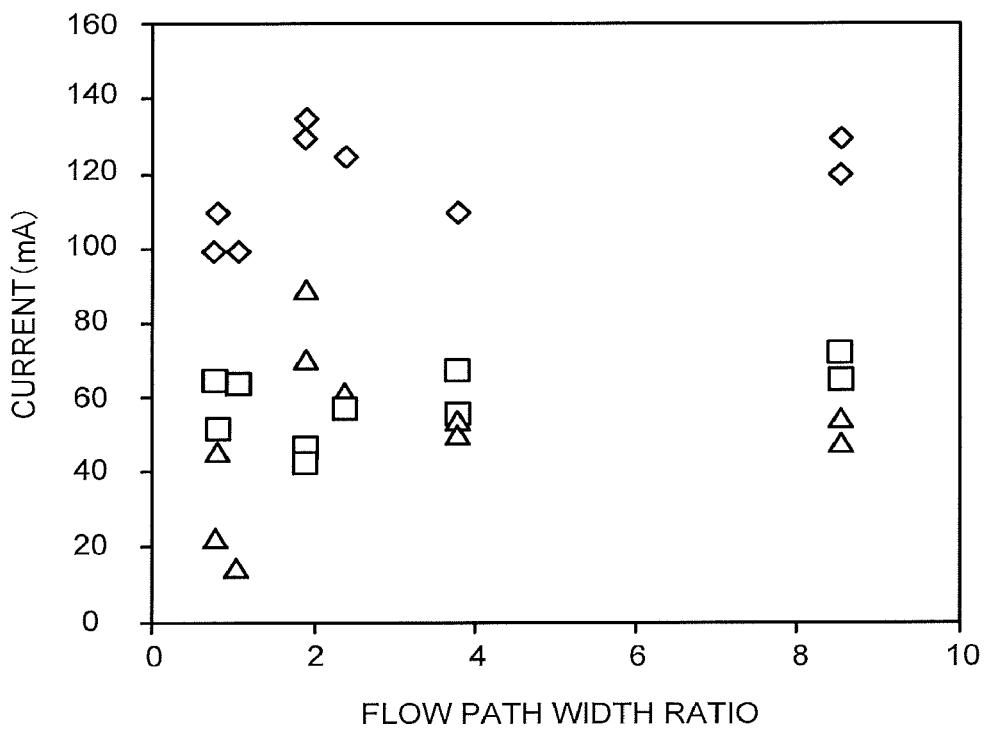
FIG. 13 is a view illustrating the relationship between a flow path width ratio and the overall current or the partial current.

FIG. 13 is a view illustrating the relationship between the flow path width ratio and the overall current or the partial current. In FIG. 13, each square mark indicates the relationship between the flow path width ratio and the partial current of the hydrogen, each triangle mark indicates the relationship between the flow path width ratio and the partial current of the carbon monoxide, and each rhombus mark indicates the relationship between the flow path width ratio and the overall current. When the flow path width ratio is 1.9, the overall current exhibits a high value, which reveals that it becomes difficult to obtain 45 mA or more of the partial current of the carbon monoxide as long as the flow path width ratio is at least 1.5 or more and 5 or less. As long as the width between the extended portions of the flow path is also wide, reaction selectivity of the carbon monoxide improves and the partial current of the carbon monoxide also increases. In the case of the reciprocation number being 1.5, the partial current of the carbon monoxide is high, but the overall current is low.

Figure 14:
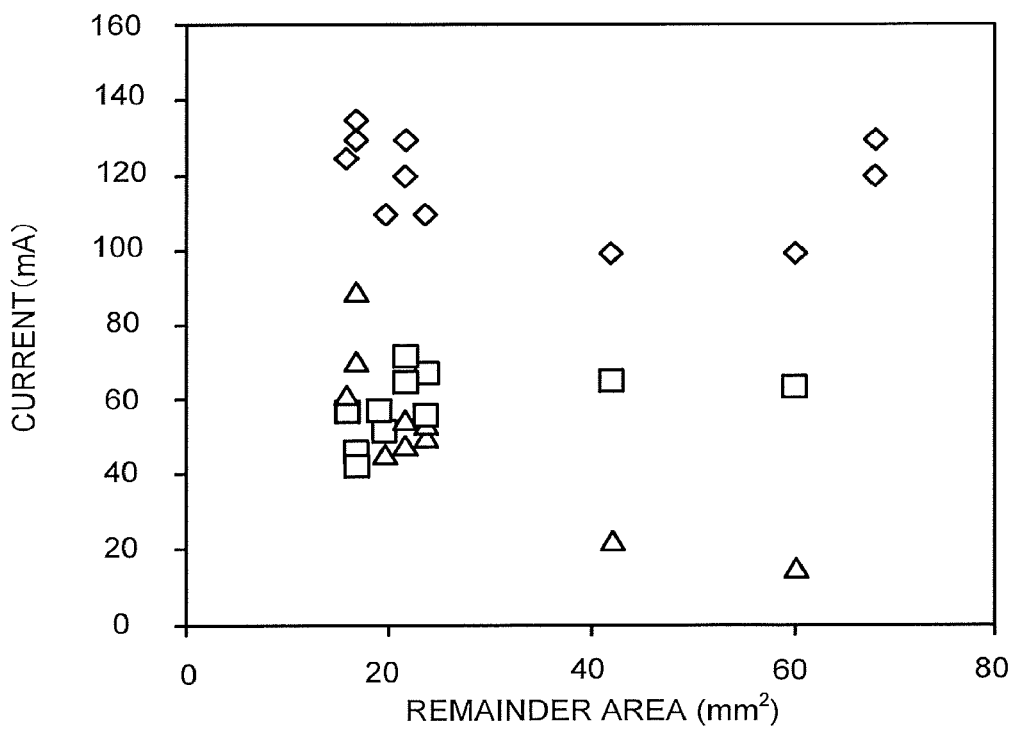
FIG. 14 is a view illustrating the relationship between an overlap remainder area and the overall current or the partial current.

FIG. 14 is a view illustrating the relationship between the overlap remainder area and the overall current or the partial current. In FIG. 14, each square mark indicates the relationship between the overlap remainder area and the partial current of the hydrogen, each triangle mark indicates the relationship between the overlap remainder area and the partial current of the carbon monoxide, and each rhombus mark indicates the relationship between the overlap remainder area and the overall current. In a region with the overlap remainder area being 25 mm$^2$ or less, the partial current of the carbon monoxide is 45 mA or more. This reveals that the ratio of the area of the overlap remainder to the area of one surface of the first or second porous conductive layer is preferred to be ⅙ or less.

A comparison between Comparative example 1 and Comparative example 2 reveals that the flow path areas are almost the same and in Comparative example 1, the inter-extended portion width is wide and the remainder area is small. Further, the Faraday's efficiency of the carbon monoxide is 15% in Comparative example 1 and 23% in Comparative example 2, and the partial current is 15 mA in Comparative example 1 and 23 mA in Comparative example 2. The overall current values are almost the same, to thus reveal that Comparative example 2 is higher in the cell performance than Comparative example 1. This is because the contribution of the efficiency improvement due to the overlap remainder area being small rather than the inter-extended portion width being narrow was large. This is because in the case of the shortest distance between the overlap end portion and the overlap being long, the concentration of water inside the first porous conductive layer increases to generate hydrogen greatly.

In Comparative example 1, the extended portion width and the inter-extended portion width is each 1.5 mm, while in Comparative example 2, the extended portion width is 1.4 mm and the inter-extended portion width is 2 mm. It is possible to confirm that the reaction selectivity of the carbon monoxide is higher in Comparative example 2 even though the structure having a wide inter-extended portion width is disadvantageous to the selectivity of the carbon monoxide. This is because in Comparative example 2, of the flow path overlap, the length in the X-axis direction is 17 mm and the length in the Y-axis direction is 16.5 mm, to thus extremely increase the remainder area. However, the efficiency is low and the formation of Comparative example 2 is not preferred practically.

In an actual cell, the reaction is caused on a cell area of about 100 cm$^2$, so that the ratio of the overlap remainder area to the area of the overlap is small to reduce the effect. As a result of calculation considering the fact that the size of a cell to be used actually is 7 cm square or more, the ratio of the overlap remainder area to the area of the overlap needs to be 0.7 or less in order for at least the width of the remainder to be 1.5 mm or less, and it can be said that the ratio being equal to or less than this is effective for the cell performance improvement.

Figure 15:
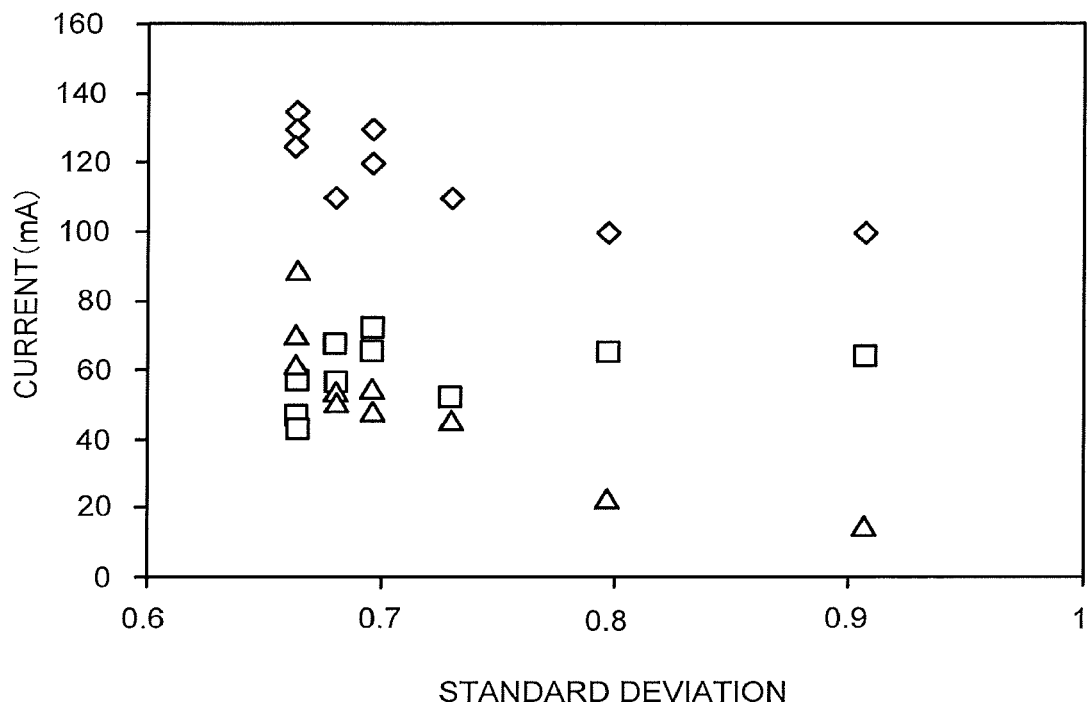
FIG. 15 is a view illustrating the relationship between a standard deviation cc and the overall current or the partial current.

FIG. 15 is a view illustrating the relationship between the standard deviation $\alpha$ and the overall current or the partial current. In FIG. 15, each square mark indicates the relationship between the standard deviation $\alpha$ and the partial current of the hydrogen, each triangle mark indicates the relationship between the standard deviation $\alpha$ and the partial current of the carbon monoxide, and each rhombus mark indicates the relationship between the standard deviation $\alpha$ and the overall current. FIG. 15 reveals that the standard deviation $\alpha$ is preferred to be 0.8 or less. Further, the standard deviation $\alpha$ is preferred to be 0.75 or less in order that the Faraday's efficiency of the carbon monoxide may become 40% or more, the partial current value of the carbon monoxide may become about 50 mA, and the production amount ratio of the carbon monoxide to the hydrogen may become 1:1 or more.

Figure 16:
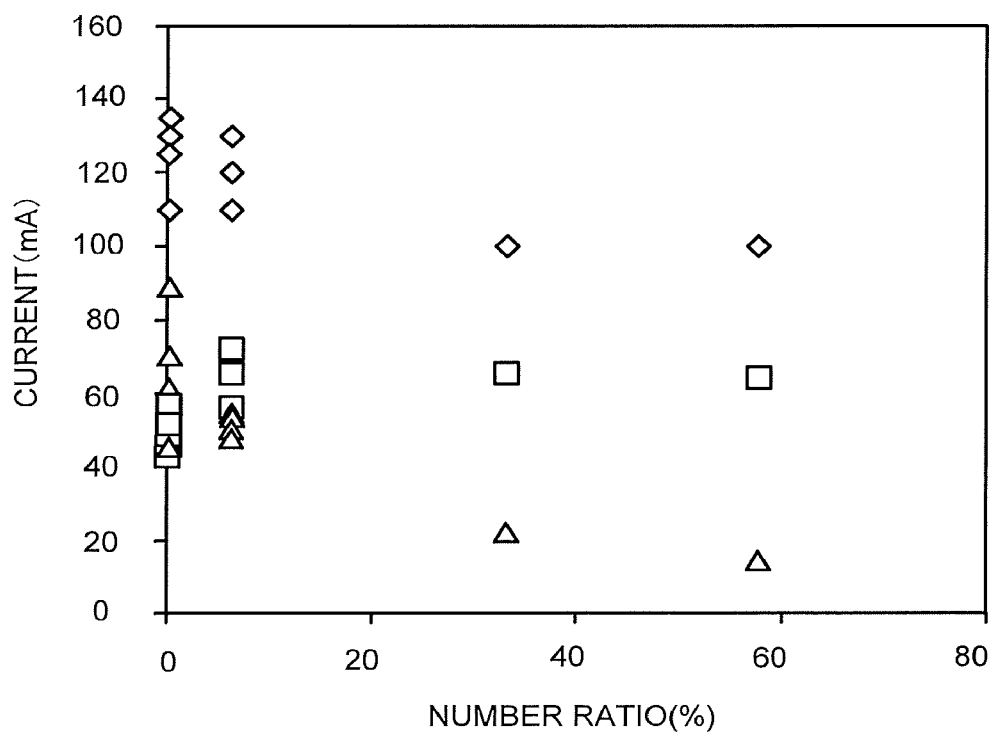
FIG. 16 is a view illustrating the relationship between a number ratio and the overall current or the partial current.

FIG. 16 is a view illustrating the relationship between the number ratio of the intersection point, at which the shortest distance between the intersection point of the first parting line and the second parting line and the flow path overlap is 0.5 mm or more, and the overall current or the partial current. In FIG. 16, each square mark indicates the relationship between the number ratio and the partial current of the hydrogen, each triangle mark indicates the relationship between the number ratio and the partial current of the carbon monoxide, and each rhombus mark indicates the relationship between the number ratio and the overall current. As illustrated in FIG. 16, it is found out that in the case of the number ratio being greater than 30%, the hydrogen is generated greatly and the production amount of the carbon monoxide is extremely small, and thus, the number ratio is preferred to be at least 30% or less. It is more preferably 20% or less and desirably 10% or less, resulting in that it is preferred because the Faraday's efficiency of the carbon monoxide becomes about 50%.

In these examples and the comparative examples, the flow path extending in a serpentine shape was used so that effects of a side flow caused by the flow path structure and a power generation distribution in the cell could be suppressed, and in a region with a large flow rate of the carbon dioxide, a comparison was made among these examples and the comparative examples in the flow path structure and thereby a comparison was made in the flow path area and other parameters. However, the reaction selectivity varies depending on the concentrations of the water and the carbon dioxide in the first porous conductive layer in the cell, and therefore the similar effect can be obtained not only with the flow path in a serpentine shape, but also with other flow paths in a lattice shape, and the like.

Further, these ratios and tendencies vary also depending on the catalyst and the gas diffusion layer, and changing the catalyst and the solution components also makes it possible to change the products and the ratios. As a result of changing the gas diffusion layer to recognize the difference according to the flow path structure, a preferred positional relationship of electrolysis efficiency of the carbon monoxide does not change greatly and similar effects are recognized. This is because a tendency of a concentration distribution of the carbon dioxide in a lower portion of the flow path and a tendency of a concentration distribution of the water in a lower portion of a region between the extended portions are similar. As values resulting from reduction of water repellency of the gas diffusion layer, the overall current value and the selectivity of the carbon monoxide tend to decrease, but in the graph shape, similar values are illustrated in terms of a peak position of the partial current value of the electrolysis of the carbon monoxide and a range of the Faraday's efficiency and similar effects are exhibited. As for a cell voltage similarly, in the case of a lower voltage, the total value decreases and the ratio of the carbon monoxide tends to increase, but similar effects are recognized also from the viewpoint of a partial current density of the reduction of the carbon dioxide. In the case of a high voltage, the total value increases and the ratio of the carbon monoxide tends to decrease, but a similar tendency is recognized regarding a preferred position of the partial current density of the reduction of the carbon dioxide. Further, also in the reduction reaction of the carbon dioxide using a copper catalyst, similar tendencies are obtained in terms of each of the overall current density, the Faraday's efficiency, and the overall current value of the hydrogen and the carbon dioxide.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device, comprising:
   an anode configured to oxidize water and thus generate oxygen;
   an electrolytic solution flow path facing the anode and through which an electrolytic solution comprising water flows;
   a cathode comprising a porous conductive layer and a reduction catalyst layer, wherein the porous conductive layer has a first surface and a second surface, wherein the reduction catalyst layer has a third surface on the first surface and comprises a reduction catalyst, and wherein the reduction catalyst is configured to reduce carbon dioxide and thus generate a carbon compound;
   a separator between the anode and the cathode; and
   a metallic plate,
   wherein:
   the metallic plate comprises
      a first metallic layer having an inlet and an outlet; and
      a second metallic layer having a first metallic region, a second metallic region, and a flow path through which the carbon dioxide flows, wherein the first metallic region is spaced from the first metallic layer and has a fourth surface on the second surface, wherein the second metallic region bends from the first metallic region to the first metallic layer in a cross section perpendicular to the fourth surface of the second metallic layer, wherein the second metallic region is in contact with the first metallic layer, wherein the flow path is disposed between the second metallic region and the second surface, and wherein the second metallic region has a first opening connected to the inlet and a second opening connected to the outlet, and
      a ratio of an area of an overlap of the second surface and the flow path to an area of the second surface is from 0.66 to 0.815,
   an overlap of the second and fourth surfaces is divided along first lines and second lines except for the overlap of the second surface and the flow path, the first lines are away from each other along a first direction of the fourth surface at intervals of 0.1 mm, the second lines are away from each other along a second direction perpendicular to the first direction along the fourth surface at intervals of 0.1 mm, the first lines and the second lines cross each other to define intersection points, and a standard deviation of shortest distances between each of the intersection points and the overlap of the second surface and the flow path is 0.695 or less,
   the flow path comprises a first part, a second part and a third part, the first part extends along the fourth surface, the third part extends along the first part, and the second part extends and bends from the first part to the third part, and
   a ratio of an average width of the first part to an average width between the first and third parts is from 1.86 to 2.33.

2. The device according to claim 1, wherein the second surface is divided into a polygonal portion and a remainder portion, wherein the polygonal portion is formed by connecting vertexes of the overlap of the second surface and the flow path, wherein each of interior angles of the overlap corresponding to the vertexes is less than 180 degrees, and a ratio of an area of the remainder portion to the area of the second surface is 1/6 or less.

3. The device according to claim 1, wherein the standard deviation is 0.663 or less.

4. The device according to claim 1, wherein an overlap of the second and fourth surfaces is divided along first lines and second lines except for the overlap of the second surface and the flow path, wherein the first lines are away from each other along the first direction at intervals of 0.1 mm, and the second lines are away from each other along the second direction at intervals of 0.1 mm, wherein the first lines and the second lines cross each other to define intersection points, and shortest distances between each of 30% or less of the intersection points in a number ratio and the overlap of the second surface and the flow path are at least 0.5 mm.

5. The device according to claim 1, wherein a ratio of an area of an overlap of the third surface and the flow path to an area of the third surface is from 0.5 to 0.85.

6. The device according to claim 5, wherein the second surface is divided into a polygonal portion and a remainder portion, wherein the polygonal portion is formed by connecting vertexes of the overlap of the third surface and the flow path, wherein each of interior angles of the overlap corresponding to the vertexes is less than 180 degrees, and a ratio of an area of the remainder portion to the area of the third surface is 1/6 or less.

7. The device according to claim 5, wherein an overlap of the third and fourth surfaces is divided along third lines and fourth lines except for the overlap of the third surface and the flow path, wherein the third lines are away from each other along the first direction at intervals of 0.1 mm, and the fourth lines are away from each other along the second direction at intervals of 0.1 mm, wherein the third lines and the fourth lines cross each other to define intersection points, and a standard deviation of shortest distances between each of the intersection points and the overlap of the third surface and the flow path is 0.8 or less.

8. The device according to claim 5, wherein an overlap of the third and fourth surfaces is divided along third lines and fourth lines except for the overlap of the third surface and the flow path, wherein the third lines are away from each other along the first direction at intervals of 0.1 mm, and the fourth lines are away from each other along the second direction at intervals of 0.1 mm, wherein the third lines and the fourth lines cross each other to define intersection points, and shortest distances between each of 30% or less of the intersection points in a number ratio and the overlap of the third surface and the flow path are at least 0.5 mm.

9. An electrochemical reaction device, comprising:
a first anode configured to oxidize water and thus generate oxygen;
a first cathode configured to reduce carbon dioxide and thus generate a carbon compound;
a first separator between the first anode and the first cathode;
a second anode configured to oxidize the water and thus generate the oxygen;
a second cathode configured to reduce the carbon dioxide and thus generate the carbon compound;
a second separator between the second anode and the second cathode;
a first metallic layer having an inlet and an outlet;
a second metallic layer disposed between the first cathode and the first metallic layer; and
a third metallic layer disposed between the first anode and the second cathode,
wherein:
the first cathode comprises
a porous conductive layer having a first surface and a second surface, and
a reduction catalyst layer having a third surface on the first surface and containing a reduction catalyst, wherein the reduction catalyst is configured to reduce the carbon dioxide and thus generate the carbon compound;
the second metallic layer comprises
a first metallic region spaced from the first metallic layer and having a fourth surface on the second surface,
a second metallic region bending from the first metallic region to the first metallic layer in a cross section perpendicular to the fourth surface of the second metallic layer, being in contact with the first metallic layer, and having a first opening connected to the inlet and a second opening connected to the outlet,
a first flow path disposed between the first metallic region and the first metallic layer, and through which an electrolytic solution containing the water and the carbon dioxide flows, and
a second flow path disposed between the second metallic region and the second surface, facing the second surface, and through which the electrolytic solution flows;
the first metallic region has a third opening penetrating the second metallic layer;
the third metallic layer comprises
a third metallic region spaced from the first anode and having a fourth opening penetrating the third metallic layer,
a fourth metallic region bending from the third metallic region to the first anode in a cross section perpendicular to the fourth surface of the third metallic layer,
a third flow path disposed between the third metallic region and the first anode, and through which the electrolytic solution flows, and
a fourth flow path disposed between the fourth metallic region and the second cathode, facing the second cathode, and through which the electrolytic solution flows; and
a ratio of an area of an overlap of the second surface and the second flow path to an area of the second surface is from 0.66 to 0.815,
an overlap of the second and fourth surfaces is divided along first lines and second lines except for the overlap of the second surface and the second flow path, the first lines are away from each other along a first direction of the fourth surface at intervals of 0.1 mm, the second lines are away from each other along a second direction perpendicular to the first direction along the fourth surface at intervals of 0.1 mm, the first lines and the second lines cross each other to define intersection points, and a standard deviation of shortest distances between each of the intersection points and the overlap of the second surface and the flow path is 0.695 or less,
the second flow path comprises a first part, a second part and a third part, the first part extends along the fourth surface, the third part extends along the first part, and the second part extends and bends from the first part to the third part, and
a ratio of an average width of the first part to an average width between the first and third parts is from 1.86 to 2.33.

10. The electrochemical reaction device according to claim 9, wherein the second flow path has a first part, a second part and a third part, wherein the first part extends along the fourth surface, the third part extends along the first part, and the second part extends and bends from the first part to the third part,
wherein a ratio of an average width of the first part to an average width between the first and third parts is from 1.5 to 5.

11. The electrochemical reaction device according to claim 9, wherein the second surface is divided into a polygonal portion and a remainder portion, wherein the polygonal portion is formed by connecting vertexes of the overlap of the second surface and the second flow path, wherein each of interior angles of the overlap corresponding to the vertexes is less than 180 degrees, and a ratio of an area of the remainder portion to the area of the second surface is ⅙ or less.

12. The electrochemical reaction device according to claim 9, wherein the standard deviation is 0.663 or less.

13. The electrochemical reaction device according to claim 9, wherein an overlap of the second and fourth surfaces is divided along first lines and second lines except for the overlap of the second surface and the second flow path, wherein the first lines are away from each other along the first direction at intervals of 0.1 mm, and the second lines are away from each other along the second direction at intervals of 0.1 mm, wherein the first lines and the second lines cross each other to define intersection points, and shortest distances between each of 30% or less of the intersection points in a number ratio and the overlap of the second surface and the second flow path are at least 0.5 mm.

14. The electrochemical reaction device according to claim 9, wherein a ratio of an area of an overlap of the third surface and the second flow path to an area of the third surface is from 0.5 to 0.85.

15. The electrochemical reaction device according to claim 14, wherein the third surface is divided into a polygonal portion and a remainder portion, wherein the polygonal portion is formed by connecting vertexes of the overlap of the third surface and the second flow path, wherein each of interior angles of the overlap corresponding to the vertexes is less than 180 degrees, and a ratio of an area of the remainder portion to the area of the third surface is 1/6 or less.

16. The electrochemical reaction device according to claim 14, wherein an overlap of the third and fourth surfaces is divided along third lines and fourth lines except for the overlap of the third surface and the second flow path, wherein the third lines are away from each other along the first direction at intervals of 0.1 mm, and the fourth lines are away from each other along the second direction at intervals of 0.1 mm, wherein the third lines and the fourth lines cross each other to define intersection points, and a standard deviation of shortest distances between each of the intersection points and the overlap of the third surface and the second flow path is 0.8 or less.

17. The electrochemical reaction device according to claim 14, wherein an overlap of the third and fourth surfaces is divided along third lines and fourth lines except for the overlap of the third surface and the second flow path, wherein the third lines are away from each other along the first direction at intervals of 0.1 mm, and the fourth lines are away from each other along the second direction at intervals of 0.1 mm, wherein the third lines and the fourth lines cross each other to define intersection points, and shortest distances between each of 30% or less of the intersection points in a number ratio and the overlap of the third surface and the second flow path are at least 0.5 mm.

18. An electrochemical reaction device, comprising:
an anode configured to oxidize water and thus generate oxygen;
an electrolytic solution flow path facing the anode and through which an electrolytic solution comprising the water flows;
a cathode comprising a porous conductive layer and containing a reduction catalyst layer, wherein the porous conductive layer has a first surface and a second surface, wherein the reduction catalyst layer has a third surface disposed on the first surface and contains a reduction catalyst, and wherein the reduction catalyst is configured to reduce carbon dioxide and thus generate a carbon compound;
a separator between the anode and the cathode; and
a metallic plate, wherein
the metallic plate comprises:
a fourth surface on the second surface; and
a flow path facing the second surface and through which a gas comprising the carbon dioxide flows, wherein the flow path comprises a first part, a second part and a third part, wherein the first part extends along the fourth surface, the third part extends along the first part, and the second part bends from the first part to the third part,
the fourth surface has a fourth part in contact with the second surface between the first and third parts,
a ratio of an area of an overlap of the second surface and the flow path to an area of the second surface is from 0.66 to 0.815,
an overlap of the second and fourth surfaces is divided along first lines and second lines except for the overlap of the second surface and the flow path, wherein the first lines are away from each other along a first direction of the fourth surface at intervals of 0.1 mm, and the second lines are away from each other along a second direction perpendicular to the first direction along the fourth surface at intervals of 0.1 mm, wherein the first lines and the second lines cross each other to define intersection points, and a standard deviation of shortest distances between each of the intersection points and the overlap of the second surface and the flow path is 0.695 or less, and
a ratio of an average width of the first part to an average width between the first and third parts is from 1.86 to 2.33.

19. The electrochemical reaction device according to claim 18, wherein the metallic plate comprises:
a first metallic layer having an inlet and an outlet; and
a second metallic layer having a first metallic region, a second metallic region, the flow path being between the cathode and the second metallic region, wherein the first metallic region is spaced from the first metallic layer, wherein the second metallic region bends from the first metallic region to the first metallic layer in a cross section perpendicular to the fourth surface of the second metallic layer, wherein the first metallic region has the fourth surface, the second metallic region is in contact with the first metallic layer, and the second metallic region has a first opening connected to the inlet and a second opening connected to the outlet.

* * * * *